US012792939B1

(12) United States Patent
Dabell

(10) Patent No.: US 12,792,939 B1
(45) **Date of Patent: *Nov. 10, 2026**

(54) SYSTEM FOR PROVIDING ESTIMATED PATROL PROPERTIES AND HISTORIC PATROL RECORDS

(71) Applicant: Steve Dabell, Spokane, WA (US)

(72) Inventor: Steve Dabell, Spokane, WA (US)

( * ) Notice: Subject to any disclaimer, the term of this patent is extended or adjusted under 35 U.S.C. 154(b) by 905 days.

This patent is subject to a terminal disclaimer.

(21) Appl. No.: 17/962,049

(22) Filed: Oct. 7, 2022

Related U.S. Application Data

(63) Continuation of application No. 16/920,683, filed on Jul. 4, 2020, now Pat. No. 11,507,870.

(51) Int. Cl.
*G06N 7/01* (2023.01)
*G06F 16/2455* (2019.01)

(52) U.S. Cl.
CPC ........... *G06N 7/01* (2023.01); *G06F 16/2455* (2019.01)

(58) Field of Classification Search
CPC ...... G06F 16/2455; G06N 7/01; G08G 1/012; G08G 1/0129; G08G 1/0137; G08G 1/0141; G08G 1/096716; G08G 1/096741; G08G 1/096775
See application file for complete search history.

(56) References Cited

U.S. PATENT DOCUMENTS 8,209,114 B2 * 6/2012 Ishikawa .............. G08G 1/0104 701/119
8,296,062 B2 * 10/2012 Yamane ........... G08G 1/096866 701/428
8,373,588 B2 * 2/2013 Kuhn ...................... G01S 7/022 342/176
2008/0071467 A1 * 3/2008 Johnson ................. G01C 23/00 701/119

FOREIGN PATENT DOCUMENTS

NL 1020266 C2 * 9/2003 ............. G08G 1/052
WO WO-2012065188 A2 * 5/2012 ........... G08G 1/0112

OTHER PUBLICATIONS

M. Fire, D. Kagan, R. Puzis, L. Rokach and Y. Elovici, "Data mining opportunities in geosocial networks for improving road safety," 2012 IEEE 27th Convention of Electrical and Electronics Engineers in Israel, Eilat, Israel, 2012, pp. 1-4, doi: 10.1109/EEEI.2012.6377049. (Year: 2012).*
Wilde et al. (NL-1020266-C2) (English Translation) (Year: 2003).*

* cited by examiner

*Primary Examiner* — Adam R Mott
*Assistant Examiner* — Abigail Lee Espinoza

(57) ABSTRACT

It is an object of the present invention to provide a predictive traffic law enforcement profiler apparatus and method which incorporates a means to determine current location, time, velocity and also incorporates a means to utilize a database derived from historic traffic law enforcement records, crowd sourced records and historical traffic data and also incorporates a predictive processing means to provide historic traffic law enforcement records and estimates of enforced speed limits and enforcement profiles, patrol locations and schedules of traffic law enforcement to a driver.

25 Claims, 5 Drawing Sheets

SYSTEM FOR PROVIDING ESTIMATED PATROL PROPERTIES AND HISTORIC PATROL RECORDS

CROSS REFERENCE OF RELATED APPLICATIONS

This patent is related to US Pending patent application Ser. No. 16/920,683 Application date Jul. 4, 2020 by the same inventor.

BACKGROUND OF THE INVENTION

The present invention relates to electronic devices used to provide information to drivers and more particularly relates to a method and apparatus for utilizing historical data to predict traffic law enforcement patrol patterns, locations, schedules, speed traps, and enforcement profile.

It is well known that road condition information is very important to drivers to improve efficiency and safety of travel. In particular it is beneficial to maximize the amount of relevant road information that is available to drivers and present it in an optimally beneficial way. Heretofore, the most common road condition information has been real time and available from radar detectors for locating immediate traffic law enforcement patrol locations, radar detectors equipped with GPS for detecting locations of red light cameras, fixed speed traps and from the Department of Transportation through GPS based vehicle navigation systems for providing real time road condition data.

However, these techniques primarily provide only real time road condition information and do not provide historic and probabilistic or statistical data. More specifically, data available from traditional radar detectors only provides the driver with immediate law enforcement locations with very little warning. Additionally, current generation radar detectors and smart cell phones equipped with GPS for detecting red light cameras or fixed speed traps only provide fixed location of traffic law enforcement. Additionally, onboard vehicle navigation systems provide only near real time road accident, hazard and condition information. Additionally, exclusive crowd sourced databases of traffic law enforcement encounters are limited and compromised by accuracy of reports. Heretofore, none of the existing driver information apparatus provide the driver with historical statistical and probabilistic data and none predict likely locations of traffic law enforcement or patrol locations, patrol schedules, enforcement profiles, or enforced speed limit.

It is an object of the present invention to provide historic traffic law enforcement patrol information. An additional object of the present invention is to utilize historic traffic law enforcement information to statistically predict the locations, schedules, and enforcement profile where drivers are likely to encounter traffic law enforcement patrols, speed traps, fixed and mobile speed cameras, red light cameras and provide the enforced speed limit.

It is an additional object of the present invention to utilize historic traffic law enforcement patrol citation records to statistically predict the probabilistic locations of traffic law enforcement patrols, enforcement profiles, speed traps and fixed and mobile speed cameras and red light cameras.

An additional object of the present invention is to provide historic and probabilistic traffic law enforcement patrol information, derived from historical traffic law enforcement data, and statistically predict the locations where it is more likely to encounter traffic law enforcement and speed traps and provide maximum safe speeds to avoid citation

SUMMARY OF THE INVENTION

It is a general object of the present invention to provide a method for supplying statistical and historical traffic related data to drivers. It is a more specific object of the present invention to provide a predictive traffic law enforcement profiler apparatus which incorporates a means to determine current location, date/time, velocity and also incorporates a means to access a database derived from historical traffic law enforcement records, historical crowd sourced traffic law enforcement encounter records, and historical traffic data and also incorporates a predictive processing means to statistically predict likely patrol locations, schedules, enforcement profiles of traffic law enforcement, enforcement austerity, the enforced speed limit and combinations thereof, and a means to provide this information to drivers.

It is a more specific object of the present invention to provide a predictive traffic law enforcement profiler apparatus which incorporates a means to determine current location, date/time, velocity and also incorporates a means to access a database derived from historical traffic law enforcement records, historical crowd sourced traffic law enforcement encounter records, and historical traffic data of predicted traffic law enforcement patrol schedules, locations, enforcement profiles, enforcement austerity and enforced speed limit and combinations thereof, and provide this information to drivers.

It is yet another object of the present invention to provide an apparatus and method which provides any combinations of predicted traffic law enforcement patrol locations, schedules, enforcement profiles, enforced speed limits, and the locations of fixed and mobile speed cameras, speed traps, and red light cameras.

It is yet another object of the present invention to provide an apparatus and method which provides historic traffic law enforcement patrol information and a means for filtering and presenting historic traffic law enforcement data.

It is yet another object of the present invention to provide a method for determining likely patrol locations, schedules, enforcement profiles, enforcement austerity, enforced speed limit, locations of speed traps, speed cameras, red light cameras, and combinations thereof, of traffic law enforcement and providing this information to consumers.

The present invention provides an innovational design which incorporates state of the art data processing predictive technology to provide precise action, increased accuracy, lower cost, and added functionality over known existing products.

In a preferred embodiment, the predictive traffic law enforcement profiler apparatus includes a database means, a predictive processor means, and an indicator means. The database means includes a means for providing the locations where traffic law enforcement has historically issued citations and the information associated with said citations which preferably includes combinations of type of violation, direction of travel, speed of vehicle if cited for speeding, location time and date and may also include reason for stop and type of vehicle. Said predictive processing means cross correlates records in the database to statistically predict the locations and schedules at which it is more probable to encounter traffic law enforcement, and enforcement profile further including enforcement austerity, speed traps, speed cameras, red light cameras and also estimates the enforced speed limit and combinations thereof, of traffic law enforcement. Said indicator means which preferably includes visual and or audible annunciators presents combinations of predicted locations, schedules and enforcement profile further including enforcement austerity, speed traps, speed cameras, red light cameras and also estimated enforced speed limit at said locations, of traffic law enforcement.

In another preferred embodiment, the predictive traffic law enforcement profiler apparatus includes a means to provide estimates of patrol schedules, locations and enforcement profile and combinations thereof, of traffic law enforcement at a singular or plurality of locations comprising: a database means, access means and an indicator means. Said database means provides records, derived from issued citations of traffic law enforcement and crowd sourced encounters with traffic law enforcement and combinations thereof, of patrol schedules, patrol locations, and estimated enforcement profile including any combinations of: enforced speed limits, speed traps, speed cameras, red light cameras and enforcement austerity of traffic law enforcement. Said access means to retrieve combinations of said patrol schedules, patrol locations, and enforcement profile including any combinations of: enforced speed limits, speed traps, speed cameras, red light cameras and enforcement austerity of traffic law enforcement. Said indicator means to present combinations of said patrol schedules, patrol locations, and estimated enforcement profile including any combinations of: enforced speed limits, speed traps, speed cameras, red light cameras of traffic law enforcement.

In another preferred embodiment, the predictive traffic law enforcement apparatus for providing estimates of the enforced speed limit, patrol schedules and enforcement profiles of traffic law enforcement and combinations thereof at a singular or plurality of first locations comprising: a database means, location and velocity determining means, time determining means, record access means and indicator means. Said database means for providing records of estimated traffic law enforcement patrol schedules, enforced speed limits and enforcement profiles derived from a combination of issued citations and crowd sourced encounters of traffic law enforcement at a second plurality of locations. Said location and velocity determining means for determining the location and current velocity of said apparatus. Said record access means to retrieve combinations of said estimated traffic law enforcement patrol schedules, enforced speed limits and enforcement profiles at said first locations from said database means. Said indicator means to present combinations of said estimated patrol schedules, enforced speed limits, and enforcement profiles of traffic law enforcement at said first locations. Said indicator means to notify when said apparatus location is within or approaching locations of said estimated patrol schedules, enforcement profiles and combinations thereof; and a second indicator means to notify when said apparatus velocity exceeds said estimated enforced speed limit at said location of said apparatus.

In another preferred embodiment, the predictive traffic law enforcement profiler apparatus includes a location determining means, current time and date determining means, a database means, user input means, a predictive processor means and an indicator means. Said location determining means includes a means to determine the latitude and longitude location and current velocity. Said time of day determining means includes a means to determine the current date and time. Said database means includes a means for providing the locations where traffic law enforcement has historically issued citations and the information associated with said citations which preferably includes combinations of type of violation, direction of travel, violation speed if cited for speeding, location time and date and may also include reason for stop and type of vehicle. Said predictive processing means correlates current location, velocity, time of day, and user criteria with entries in the database to statistically predict the locations where it is more likely to encounter traffic law enforcement, red light cameras, speed cameras and speed traps and provide maximum safe speeds to avoid citation and provide said information via the indicator means which preferably includes both visual and audible annunciators.

In yet another preferred embodiment, the predictive traffic law enforcement profiler apparatus includes a client means and a server means. Said client means includes a location determining means, a time of day determining means, an indicator means and a means to communicate with one or more said server means. Said server means preferably includes a database means, a predictive processor means and a means to communicate with one or more clients. Said server database means includes a means for providing the locations where traffic law enforcement has historically issued citations and the information associated with said citations which preferably includes combinations of type of violation, direction of travel, speed of vehicle if cited for speeding, location time and date and may also include reason for stop and type of vehicle. Said client location determining means includes a means to determine the latitude and longitude location and current velocity. Said client time of day determining means includes a means to determine the current date and time. Said client communication means provides a means to communicate the client location, client time of day, and client velocity to said server means. Said server predictive processor means correlates said client location, said client velocity, said client time of day, and user client criteria with records in said server database means to statistically predict the locations where it is more likely for said client to encounter any combinations of traffic law enforcement, speed traps, red light cameras, speed cameras and provide maximum safe client speeds to avoid citation derived from said server database of historical issued citations and provide said predicted locations, speed traps, speed cameras and maximum client speeds to avoid citation through said server communication means to said client. Said client indicator means preferably includes combinations of visual and audible annunciators to present any combinations of said server predicted locations of traffic law enforcement, speed traps, red light cameras, speed cameras and maximum client speeds to avoid citation.

In yet another preferred embodiment the predictive traffic law enforcement profiler apparatus includes a means to provide estimates of traffic law enforcement austerity comprising: a location determining means, database means, database access means, and an indicator means. Wherein said database means comprising estimates of enforcement austerity derived from historic records of issued citation warnings, historic records of traffic flow rates and volumes, records of issued citations of traffic law enforcement, and crowd sourced traffic law enforcement encounters and combinations thereof. Said access means to retrieve a combination of said estimated enforcement austerity and an indicator means to present enforcement austerity at said location.

In yet another preferred embodiment, a method is for providing estimates of the enforced speed limit, patrol schedules, enforcement profile, and combinations thereof, of traffic law enforcement at a singular or plurality of locations comprising the steps of: Retrieving a historical record derived from issued traffic law enforcement citations at said location. Correlating citation time, location, violation velocity and combinations thereof to determine enforced speed limit, patrol schedules, and enforcement profile of traffic law enforcement at said locations; presenting said estimated enforced speed limit, estimated patrol schedules, enforcement profiles, and combinations thereof, at said locations.

In yet another preferred embodiment, the predictive law enforcement traffic profiler driver information apparatus also includes a means for monitoring current weather conditions and a database means. The database means includes a means for storing the coordinate locations where accidents have occurred and the recorded details associated with said accidents which preferably includes cause of accident, time of said accident, and weather conditions at time of said accident. In this preferred embodiment, the said predictive processing means correlates current location and current weather conditions with said database to determine relevant locations of probable road hazards via the indictor means which preferably includes both visual and audible annunciators.

Further objects and advantages of the present invention will become apparent to those skilled in the art from a consideration of the following detailed description of the preferred embodiment and drawings.

DETAILED DESCRIPTION

Figure 1:
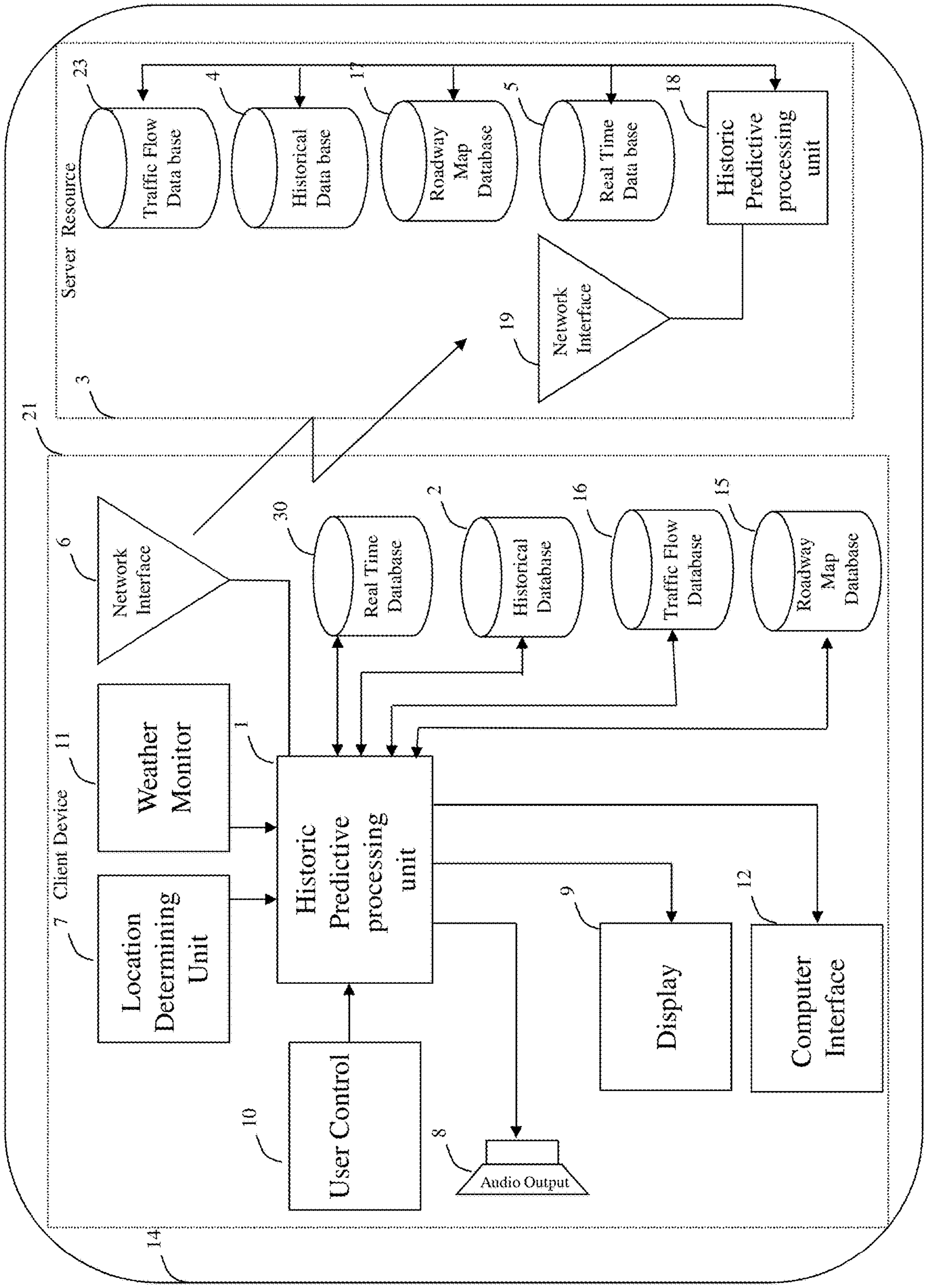
FIG. 1 Block diagram of historic and predictive traffic law enforcement profiler apparatus FIG. 2A preferred method for profiling traffic law enforcement and providing historic traffic enforcement records FIG. 3A preferred method of predicting patrol schedules at a location FIG. 4A preferred presentation of speed limit law enforcement profile FIG. 5A preferred presentation of historic traffic law enforcement data and estimated enforcement profiles, patrol locations, and patrol schedules of traffic law enforcement.

It is well known that traffic law enforcement agencies have patrol patterns, enforcement profiles and schedules that vary by location, time of day, month and year, weather conditions and traffic flow rates. Generally traffic law enforcement typically allow some flexibility in enforcing regulations; examples of which could include allowing motorists to exceed the posted speed limit by some margin before issuing a citation or allowing motorists extra time on expired vehicle registrations. The local traffic law enforcement customs may vary by location and time. For instance, in some areas the posted speed limit may be enforced strictly, while in other areas traffic law enforcement may allow much higher speed limits over the posted speed limits prior to issuing a speeding citation. Additionally, it is not uncommon for traffic speed limits to be enforced more rigorously at night than during the day or during certain holidays there may be increased traffic law enforcement patrols and the enforcement profile may be more strict and more focused in certain regions. Additionally, the use of fixed and mobile automated traffic law enforcement systems are commonly used to enforce traffic laws, examples of which include Red Light cameras which photograph and issue citations to operators or registered owners of vehicles passing through an intersection with a red light and Speed Camera systems which photograph and issue a speeding citation to operators or registered owners of vehicles exceeding the speed limit at a location. Automated traffic law enforcement systems are typically at fixed locations, or change locations periodically and also frequently exhibit predetermined enforcement profiles, which could include the enforced speed limit.

In the present invention, the terms estimated patrol schedule, patrol locations and enforcement profiles are defined in Table 1 to characterize the enforcement patterns of traffic law enforcement and utilized in subsequent descriptions of the present invention.

TABLE 1

Traffic Law Enforcement Properties and Patterns which includes combinations of: Estimated and Predicted Patrol Schedules, Patrol Locations, and Enforcement Profiles.

| Traffic Law Enforcement Property | Description |
|---|---|
| Location | The location for which these enforcement properties pertain. |
| Patrol Schedule | The times at which traffic law enforcement is predicted to be present at the Location and also predicts the times with which traffic law enforcement is predicted to not be present at a given location and the confidence of the prediction. |
| Location Patrol Intensity | The predicted intensity with which traffic law enforcement patrols the Location and may be as a function of time and the confidence of the prediction. Locations with higher Patrol Location Intensity may be considered Patrol Locations. |
| Patrol Locations | The locations at which traffic law enforcement is predicted to patrol and also predicts the locations which traffic law enforcement is predicted to not patrol and may be as a function of time and the confidence of the prediction. A Patrol Location may have higher Location Patrol Intensity. |
| Enforcement Profile | The estimated and predicted characteristics which describe traffic law enforcement at the Location which may include any combinations of:<br>a) Enforced speed limit at location and time<br>b) Speed trap enforced location<br>c) Speed camera enforced location<br>d) Red light camera enforced location<br>e) Aircraft speed limit enforced location<br>f) Histogram of enforced traffic laws<br>g) Histogram of citation speeds<br>h) Location citation density<br>i) Enforcement Profile of Traffic Laws |

TABLE 1-continued

Traffic Law Enforcement Properties and Patterns which includes combinations of: Estimated and Predicted Patrol Schedules, Patrol Locations, and Enforcement Profiles.

| Traffic Law Enforcement Property | Description |
|---|---|
| | j) Probability of traffic citation at location and time<br>k) Probability of encountering traffic law enforcement at location and time<br>l) Enforcement Austerity - traffic law enforcement inflexibility and Austereness<br>a. Enforcement Leniency Profile -probability of receiving a citation verses a warning as a function of violation type<br>b. Speed Limit Enforcement Austerity Relative to Average Traffic Flow Velocity - estimated enforced speed limit relative to the traffic velocity<br>c. Speed Limit Enforcement Austerity Relative to Average Traffic Flow Volume - estimated enforced speed limit relative to the traffic volume<br>d. Location Enforcement Austerity Relative to Average Traffic Flow Volume - estimated amount a location is patrolled relative to traffic volume |

State and city law enforcement agencies maintain databases of traffic violations that were issued. Examples of traffic violations may include but are not limited to speeding citations, expired vehicle registration, and other moving and non-moving traffic violations. Each citation record typically includes information relevant to the violation. In the case of speeding citations, typically the time, date, location, direction and speed of the vehicle are recorded. In the case of expired registrations, typically the time, date, location, and duration of expiration are recorded. In the present invention, the term "citation record" or "citation" refers to the collection of data captured with an issued citation. Additionally, it is also possible to maintain databases of crowd or user sourced data which could include information provided by individuals that experienced an encounter with traffic law enforcement. Such encounters could include traffic stops by traffic law enforcement and the reason for stop could be provided, location, time, date, and preferably the speed at which the driver was travelling could be provided to the database. Additionally, an encounter could also be a vehicle passing a traffic law enforcement vehicle in which case the location, time, date, direction and preferably speed at which the user was travelling could be contained in the database. In the present invention, the term "encounter record" or "encounter" refers to the collection of data captured with a crowd sourced encounter event with traffic law enforcement.

The historic and predictive traffic law enforcement profiler apparatus preferably utilizes databases of traffic citations, traffic stop, and arrest records maintained by law enforcement agencies including state highway patrols, city and county police departments, municipal courts, state courts, departments of motor vehicles, and in general government or private agencies collective referred to as citations, and preferably includes databases of crowd sourced encounters with traffic law enforcement collectively referred to as encounters to profile and predict the enforcement profile, patterns, locations and schedules where traffic law enforcement agencies patrol. The apparatus provides an indication to a driver when approaching an area where there is a historic or statistically significant chance of encountering traffic law enforcement personnel allowing precaution to be taken such as driving cautiously and within enforced speed limits. Additionally, the apparatus may also provide the driver with historically significant traffic law enforcement information which may include a maximum estimated speed which it is safe to drive with an acceptably low chance of being cited by law enforcement for violating the speed limit. Additionally, the apparatus preferably may provide the driver with a historical record of traffic law enforcement citations and preferably a set of database processing methods to enable searching, filtering, extracting, statistical processing, and viewing of results preferably including histogram creation, distributions, scatter plots, tables and lists.

A block diagram of a preferred embodiment of the historic and predictive traffic law enforcement profiler apparatus is shown in FIG. 1. As can be seen, the profiler apparatus, 14 preferably consists of a client device 21 and a server resource 3. The client device 21 may further include a historic and predictive processing unit 1, a location determining unit 7, a historical database 2, real time data base 30, a road map database 15, a traffic flow database 16, a visual display 9, an audible output 8, a user control 10, and a network interface 6. The server resource 3 preferably includes a historic database 4, a real time database 5, a traffic flow database 23, a roadway map database 17, a network interface 19, and a predictive processing unit 18. Databases 2, 15, 16, 30, 4, 5, 17, 23 are presented as distinct databases; however, those skilled in the art will recognize that any physical or logical combinations of databases 2, 15, 16, 30, 4, 5, 17, 23 are realizable and considered within the scope of the present invention.

A preferred embodiment of the profiler apparatus 14 includes a client device 21 and a server resource 3. In a more specific preferred embodiment the client device 21 could be implemented as a standalone device and the server resource 3 may preferably not be required. Or in another preferred embodiment the client device 21 could be implemented as a thin device, utilizing server resource 3 for providing databases 4, 5, 17, 23 and historic predictive processing unit 18 through the network interfaces 6, 19 wherein network interfaces 6, 19 could be either wireless or wired and the client device 21 may not require databases 2, 15, 16, 30 or predictive processing unit 1. In an additional preferred embodiment, client device 21 and server resource 3 are both present and share responsibility for providing database content 4, 5, 17, 23, 2, 15, 16 and predictive compute resources 1, 18.

In a preferred portable navigation device embodiment, the client device 21 of the profiler apparatus 14 could be integrated into a standalone portable navigation devices such as a TomTom, Garmin, Magellan, Nuvi or similar road navigation device in which case preferably the client device

21 could use the common resources of the portable navigation device including but not limited to the display 9, audio output 8, location determining unit 7, user control 10, predictive processing unit 1 and local databases 2, 15, 16, 30. To provide access to real time databases and physically separate historical databases and predictive processing resources, the preferred portable navigation device embodiment may also include wired and/or wireless instances of network interfaces 6, 19. Interfaces 6, 19 provide data communication with server resource 3 preferably providing records of traffic law enforcement citations and encounters from real time database 5, historical database 4, traffic flow database 23, and map database 17 and preferably server resource predictive processing unit 18.

In a preferred smart phone or tablet embodiment, the historic and predictive client device 21 could be a smart phone or tablet executing an application which may be interoperating with a web application executing on a web server 3. In the preferred smart phone embodiment, the client device 21 of the profiler apparatus 14 could be integrated with a smart phone or tablet device such as an iPhone, iPad, Google phone, Microsoft Surface tablet or device operating the Android OS, Windows OS, iOS or similar device and could use the common resources of the device preferably including but not limited to the display 9, audio output 8, location determining unit 7, user control 10, predictive processing unit 1 and local databases 2, 15, 16, 30. Additionally, the preferred smart phone or tablet embodiment could optionally utilize wired or wireless network interfaces 6, 19 which could preferably support G3, G4 or other wireless data standards to provide data communication with a server resource 3 preferably providing traffic law enforcement citations and encounters from real time database 5, historical database 4, traffic flow database 23, and map database 17 and preferably server resource predictive processing unit 18.

In a preferred personal computer embodiment, the client device 21 of the profiler apparatus 14 could be a personal computer and the server device 3 could be a web server. In the preferred personal computer embodiment, Client device 21 could use the common resources of the device preferably including but not limited to the computer screen as the display 9, computer speaker output as the audio output 8, location determining unit 7, graphical user interface as the user control 10, the central processor unit as the predictive processing unit of the personal computer and local databases 2, 15, 16, 30 which could be on a computer drive. Additionally, the preferred personal computer embodiment could utilize internet network interfaces 6,19 to provide internet data communication with a server resource 3 preferably providing traffic law enforcement encounters from real time database 5, historical database 4, traffic flow database 23, and map database 17 and preferably server resource predictive processing unit 18. Furthermore, the preferred personal computer embodiment could be a web browser or application executing on the personal computer client device 21 with server resource 3 providing predictive processing services in unit 18.

In a thin predictive processor preferred embodiment, databases 2, 15, 16, 30 could be combined into a unified database which contains combinations of pre-computed predicted patrol schedules, and enforcement profiles which may include estimated enforced speed limits, patrol schedules, patrol locations, enforcement profiles, and estimated enforcement austerity, and other properties as defined in Table 1, at a singular or plurality of locations and a map of the roadway system. The plurality of locations would preferably include locations and be limited to within the geographic region of travel. Additionally, the maximum plurality of locations would be limited by the size of the database 2, 15, 16, 30. Typically 10 billion locations could be stored with current client database technologies however, those familiar with the art, would recognize that future database technologies could exist which conceivably support additional locations. Additionally, in this preferred embodiment databases 4, 5, 17, 23 could similarly be combined into a unified database which contains combinations of the predicted enforcement profiles, estimated patrol schedules, estimated enforced speed limits, and estimated enforcement austerity at a singular or plurality of locations and a map of the roadway system. Typically 100 billion locations could be stored with current server database technologies however, those familiar with the art, would recognize that future database technologies could exist which conceivably support additional locations. In the thin predictive processor preferred embodiment, the predictive processor unit of the client 1, and server 18 could perform access functions to database 2, 15, 16, 30 and 4, 5, 17, 23 respectively, to retrieve any combinations of pattern properties presented in Table 1 including for example the predicted enforcement profiles, estimated patrol schedules, estimated enforced speed limits, and estimated enforcement austerity, at locations of interest and provide indications to the user through the audio 8 and visual 9.

As can be seen in a preferred embodiment of FIG. 1, the Client device 21 of the Historic and Predictive Processing Unit (HPPU) 1 may accept input from the User Control 10, location determining unit 7, Weather Monitor 11, and database 2, 15, 16 and 30. The Historic and Predictive Processing Unit 1 may provide annunciation output to the Audio Output 8 and Display 9 and also may have coupling to a computer interface 12 and or network interface 6 for interfacing to a server resource 3 for uploading and downloading content from server resource databases 4, 5, 17, 23 and or interacting with server applications running on server predictive processing unit 18. Additionally, it could be possible for a user of the client device 21 to upload or add entries as crowd sourced records, to client databases 2, 30 or to server databases 4, 5 using the client device network interface 6. Crowd sourced records could be shared with multiple instances of client devices 21. The network interface 6 may also enable multiple instances of client devices 21 to communicate with a server resource 3 through network interface 19 which could be wired or wireless. Examples of the server resource 3 could include a web server hosting the predictive processing algorithms application executing on predictive processor 18 which could be the server's central processing unit. In this preferred embodiment server resource 3 could serve web pages containing any combination of real time, historic and or predicted traffic law enforcement patterns, schedules, locations, enforcement profiles defined in Table 1, to client devices 21 or could also be a file server providing client device 21 access to databases 4, 5, 17, 23 which may partially or totally eliminate the need for client device local databases 2, 16, 15, 30. Preferably a plurality of client devices 21 could establish network interfaces 6 to a single instance of server resource 3 through network interface 19, wherein the number of client devices 21 may be limited to less than 10,000,000; however, as the capacity of server resource 3 increases, those skilled in the art would recognize additional client devices 21 could communicate with a server resource 3. Additionally, a network of client devices 21 could establish communications with each other through their respective network interface 6 preferably enabling multiple client devices 21 to share respective databases 2, 15, 16, 30 with other client devices 21 preferably forming a distributed database and possibly eliminating the need for server resource 3. Similarly, a plurality of server resources 3 could establish network interfaces with each other through their respective network interfaces 19 preferably enabling multiple server resources 3 to share respective databases 4, 5, 17, 23 with other server resources 3 preferably forming a distributed database, wherein the number of server resources 3 may be limited to less than 10,000,000; however, those skilled in the art will recognize additional server resources 3 could be included as network 19 capacities are increased.

The Location Determining Unit 7 may preferably provide the current location, speed, direction of travel, date and time. The location determining unit 7 could be realized using Global Positioning (GPS) technology and it is well known that speed, direction of travel, date, and time can be derived from GPS data. Utilizing the current position, time of day, speed and direction of travel provided by the Location Determining Unit 7, the HPPU 1, 18 may access the historical database of traffic law enforcement citation and encounter records 2, 4 and real time database 5, 30 of current traffic law enforcement location, citation and encounter records, and statistically profile and predict any combination of properties in Table 1 which includes the locations, schedules and enforcement profiles of traffic law enforcement patrols. Alternatively or additionally, the historical databases 2, 4 and real time database 5, 30 may contain any combination of previously computed properties in Table 1 which include combinations of predicted locations, schedules and enforcement profiles of traffic law enforcement patrols, collectively referred to as predictive record, in which case the HPPU 1, 18 may access the database 2, 4, 5, 30 to retrieve the predicted locations, schedules, and enforcement profiles of traffic law enforcement. Additionally the HPPU 1 can provide a visual representation of the historical and or predicted traffic law enforcement profile, schedules and locations to the display 9 and can also provide an acoustic representation of said historical and or predicted traffic law enforcement profile, schedules, and location information to the Audio Output 8. HPPU 1 can also provide a visual representation of the historical and or predicted traffic law enforcement profile to the display 9 combined with a map of the roadway preferably provided by client device database 15 and or server resource database 17.

The HPPU 1, 18 preferably can also utilize traffic flow rates provided by client device traffic flow database 16 and or server resource traffic flow database 23 at a given location to determine traffic velocity and density as a function of time and location. Traffic flow databases 16 and 23 preferably contain historic and real time measured traffic volume and or velocity at given locations and associated times. Utilizing historic and real time an historic traffic volume and velocity from databases 16 and or 23 and realtime and historic encounter databases 2 and or 4, the HPPU 1, 18 can determine combinations of traffic law enforcement austerity properties presented in Table 1.

More specifically, the HPPU 1, 18 can preferably determine the Enforcement Leniency Profile of Table 1 which provides an indication of traffic law enforcement patterns for issuing citation warnings verses citations. The HPPU 1, 18 may determine the Enforcement Leniency Profile for locations and time intervals of interest by utilizing database citation records 2, 4, 5, 30 to determine the ratio or magnitude of citation warnings verses citations at locations and time frames as a function of violation type. The Enforcement Leniency Profile provides an indication of how rigidly different types of violations are enforced. Additionally, the HPPU 1, 18 can preferably determine the Speed Limit Enforcement Austerity Relative to Average Traffic Flow Velocity also in Table 1 which provides a measure of the enforced speed limit relative to the average flow velocity of traffic. Speed Limit Enforcement Austerity Relative to Average Traffic Flow Velocity can be determined by the HPPU 1, 18 by determining the difference between traffic flow velocity from real time and historic traffic flow database 16, and 23 to traffic law enforcement issued citation velocities from real time and historic citation and encounter databases 2, 4, 5, 30 at given locations and times.

The HPPU 1, 18 can determine the Location Enforcement Austerity Relative to Average Traffic Volume of Table 1, which quantifies the patrol location patterns as a function of traffic volume and provides an indication as to which locations are patrolled more frequently under specific traffic volume conditions and times. The HPPU 1, 18 can determine the Location Enforcement Austerity Relative to Average Traffic Volume by utilizing the historic traffic speed and density 16, 23 to determine the probability of a vehicle having an encounter with traffic law enforcement at a given time and location and the probability at each location could provide a relative indication of the location patrol intensity or equivalently the relative amount a location is patrolled. Alternatively, if historic traffic speed and density 16,23 are not utilized, the location patrol intensity could be approximated as the location citation density which quantifies the number of citations issued within a location and time interval. The location citation density may be interpreted relative to other locations within the region to provide an indication of relative location patrol intensity. Additionally, the HPPU 1, 18 can preferably determine the Speed Limit Enforcement Austerity Relative to Average Traffic Flow Volume, presented in Table 1, which provides a measure of the enforced speed limit relative to the average flow volume of traffic. Speed Limit Enforcement Austerity Relative to Average Traffic Flow Volume can be determined at a location by the HPPU 1, 18 by determining the historic estimated enforced speed limit from databases 2,4,5,30 as presented in Table 1, at the location as a function of traffic flow volume provided by database 16, 23, and then inferring the enforced speed limit as the historic estimated enforced speed limit at said location with similar traffic flow volume.

Alternatively or additionally, combinations of the predicted traffic law enforcement patrol schedules, locations and enforcement profiles, including enforced speed limits and enforcement austerity characteristics can be previously computed and stored in databases 2, 4, 5, 30 at said given locations and times and the HPPU 1, 18 may access the database 2, 4, 5, 30 to retrieve the predicted traffic law enforcement patrol schedules, locations and enforcement profiles, including enforcement austerity and enforced speed limit and combinations thereof. Additionally the HPPU 1 can provide a visual representation of combinations of the historical and or predicted patrol locations, schedules, enforcement profiles, and austerity of traffic law enforcement to the display 9 and can also provide an acoustic representation of said historical and or predicted locations, schedules, enforcement profiles, and austerity to the Audio Output 8. HPPU 1 can also provide a visual representation of the historical and or predicted traffic law enforcement patrol locations, schedules, enforcement profiles, austerity and combinations thereof, to the display 9 combined with a map of the roadway preferably provided by client device database 15 and or server resource database 17.

Databases 2, 4, 5, 30 may contain combinations of previously computed predicted locations, schedules and enforcement profiles of traffic law enforcement, historical records and real time records derived from citations which were issued by traffic law enforcement agencies and or crowd sourced encounters with traffic law enforcement collectively referred to as citations or encounters in the present invention. Records derived from issued traffic law enforcement citations are typically considered more reliable than crowd sourced records and generally public information and are preferably compiled and maintained by law enforcement and government agencies and said agencies preferably include but are not limited to State Highway Patrols, City and County Police agencies, Department of Motor Vehicles and Municipal Courts. Data bases 2, 4, 5, 30 could also contain crowd sourced citations or encounters with traffic law enforcement contributed by individuals. Databases 2, 4, 5, 30 could contain an entry for each issued citation or encounter but could be in various compressed formats to improve storage efficiency. Each entry of databases 2, 4, 5, 30 preferably may contain a combination of the fields similar to those presented in Equation 1 for the record format; however, a subset of said fields may be available per record or additional fields such as vehicle type, or color could be present in each record. Additionally, different means could be used to compress the databases 2, 4, 5, 30 entries to improve storage efficiency. Equation 1, demonstrates a preferred content representation of each record in database 2, 4, 5, 30 derived from citation records.

record_entry={location,time,date,direction,type,violation_speed}

Equation 1. Preferred citation and encounter record properties and members of database Equation 1 record properties may also be referred to as members or events of said record. Said record member: location is preferably the location where the violation was observed and the citation issued. Said location field is preferably in latitude and longitude units; however, it could additionally be reported by but not limited to mile post marker, crossroads location, or street address. Said record member: time and date are preferably the time and date at which the encounter occurred or citation was issued, time could include both the time and date. Said record member: direction is preferably the direction of travel at which time the encounter or citation was issued. Said record member: type is preferably the type of encounter or citation which may include speeding, expired registration and other infraction types or could be the reason for traffic law enforcement stopping vehicle. Said record member: speed preferably represents the speed of the vehicle when a speeding citation was issued or could also represent the velocity which would specify both the speed and direction. Crowd sourced records of encounters with traffic law enforcement can also be stored in databases 2, 4, 5, 30 in a representative format of Equation 1, wherein crowd sourced data may be a sighting encounter of traffic law enforcement such that possibly only location, time and direction might be present in the record entry Equation 1.

Furthermore, in another preferred embodiment, databases 2, 4, 5, 30 could contain predicted traffic law enforcement properties and patterns at locations and times, derived from processed citation records similar to Equation 1, preferably including a combination of the properties defined in Table 1, and represented in Equation 1a. Those skilled in the art will recognize that additional enforcement characteristics and predicted profile properties could be derived from traffic law enforcement citation records and crowd sourced encounters with traffic law enforcement and stored in databases 2, 4, 5, 30 and should be considered within the scope of the present invention. Equation 1a, demonstrates a preferred format representation of each entry of database 2, 4, 5, 30 containing predictive entries. Said predictive_record_entries of Equation 1a preferably contain any combination of traffic law enforcement properties presented in Table 1.

Predictive_record_entry={location,patrol schedule, patrol location,location patrol intensity,enforcement profile}

Equation 1a. A preferred post processed predictive database record format. Reference Table 1 for definition of predicted traffic law enforcement properties and patterns.

Most state and city departments of transportation monitor and report historical and current traffic flow volume and rate information for roadways. Client device 21 preferably incorporates a traffic flow data base 16 which preferably contains records of historic traffic flow volumes and or historic traffic velocities at locations verses time. Additionally, server resource 3 may contain a traffic flow and velocity database 23. Databases 16 and 23 may contain real time and or historic traffic flow records. The HPPU 1, 18 can preferably utilize the traffic rate and volume from databases 16, 23 to determine the probability of a vehicle having an encounter with traffic law enforcement at a given time and location and the probability at each location preferably provides a relative indication of patrol locations. Additionally, HPPU 1, 18 can preferably determine the enforced speed limit relative to the rate and flow of traffic by comparing the traffic speed from databases 16, 23 to traffic law enforcement issued citation speeds from databases 2, 4, 5, 30 at given locations and times. Preferably HPPU 1, 18 can compare the traffic flow rate with speeding citation issued speeds and determine the estimated speed at which traffic law enforcement issues citations at given times and locations relative to the average traffic rate and or may determine the austerity with which traffic law enforcement enforces the speed limit relative to average traffic rates and volumes at given locations and times. Equation 2 demonstrates a preferred traffic flow entry format of databases 16, 23.

traffic_flow_entry={location,volume,velocity,time}

Equation 2. A preferred traffic flow entry format

Said location field of Equation. 2 is preferably in latitude and longitude coordinate units and the volume preferably represents the number of vehicles per second travelling through the location at said time and with the average said velocity.

In a preferred embodiment, the HPPU 1, 18 utilizes traffic flow and rate historical and real time records 16, 23 to enable improved prediction of traffic law enforcement speed traps, speed cameras and or patrol locations and or austerity of enforced speed limits relative to the natural flow of traffic. More specifically, in a preferred embodiment the HPPU 1, 18 may determine the relative intensity of patrols at given locations as the relative ratio of issued traffic citations to traffic volume at said given locations. In a preferred embodiment the HPPU 1, 18 may determine the location of estimated speed traps and speed cameras as locations with relative ratios of issued traffic citations to traffic volume that exceed a threshold relative to the ratios of issued traffic citations to traffic volume in surrounding areas. Furthermore, in a preferred embodiment the HPPU 1, 18 may compute the schedule of speed traps, speed cameras, and or the schedule of patrol locations by determining said ratios of issued traffic citations to traffic volume at historic times and locations and then cross correlating said ratios as a function of time to identify patrol schedules which are time correlated. Those skilled in the art will realize the austerity of enforced speed limits at corresponding locations and the locations of predicted speed traps could be computed antecedently and contained within databases 2, 4, 5, 30 and the HPPU 1, 18 could retrieve austerity of enforced speed limits and locations of predicted speed traps and speed cameras from databases 2, 4, 5, 30.

Additionally, in a preferred embodiment HPPU 1, 18 may utilize the difference between the traffic flow average velocity from database 16, 23 at locations and the velocities at which citations have been issued at said locations from databases 2, 4, 5, 30 and determine an indication of speed limit enforcement profile and austerity relative to traffic flow velocities. Furthermore, in a preferred embodiment the HPPU 1, 18 may estimate the schedule of speed limit austerity relative to traffic flow velocities by determining the difference between the historic traffic flow average velocity 16, 23 at locations and times and the velocities at which historic citations have been issue at corresponding locations and times from database 2, 4, 5, 30. Said differences are then cross correlated as a function of time to identify speed limit traffic law enforcement austerity at corresponding locations which are time correlated and thus estimate future speed limit enforcement profile austerity. Those skilled in the art will realize the austerity of enforced speed limits relative to traffic flow average velocities and volumes at corresponding locations could be computed antecedently and contained within databases 2, 4, 5, 30 and the HPPU 1, 18 could retrieve austerity of enforced speed limits relative to traffic flow rates from databases 2, 4, 5,30.

In a preferred embodiment the HPPU 1, 18 can determine an optimal driving route to maximize travel speed and minimize the probability of receiving a citation by utilizing the ratio of traffic volume 16, 23 verses traffic citation density 2, 4, 5 at locations along optional routes to determine an optimal route which maximizes the said ratio and minimizes the travel time.

Traffic law enforcement encounters and citations may be reported based on the milepost marker or address thus, databases 2, 4 preferably could contain entries for mapping Mile Post Marker to latitude and longitude coordinates, and street address latitude and longitude coordinates.

coordinate={location by mile post,street address,lat-long}

Equation 3. Mile Post, address to latitude and longitude example entry format

Figure 2:
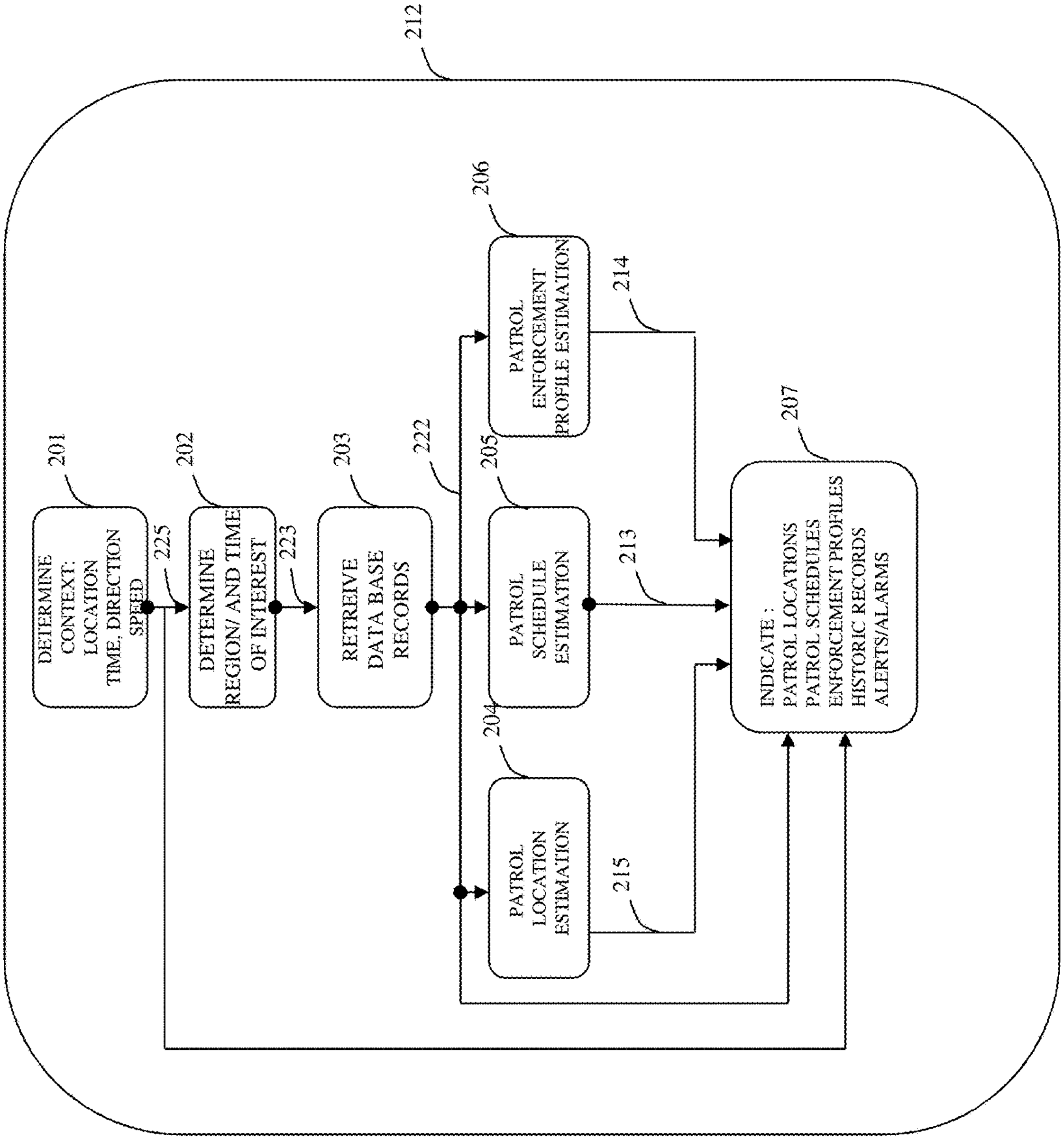

FIG. 2 shows a preferred method 212, for profiling traffic law enforcement. The objectives of method 212 may include combinations of predicting the likely traffic law enforcement patrol locations, schedules, enforcement profiles, speed trap locations, red light camera locations, speed camera locations, enforcement austerity, enforcement histograms, maximum driving speed to avoid citation and are summarized in Table 1. Further objectives of method 212 may include providing historical and real time records of traffic patrol and traffic enforcement citations and encounters. Method 212 could be implemented by a preferred embodiment of the traffic law enforcement profiler apparatus 14. More specifically, in a preferred embodiment, method 212 could be implemented on the client device 21 or in combination with server resource 3 or in combination with a plurality of client devices 21 or a plurality of server resources 3. Said plurality of client devices 21 and plurality of server resources 3 could be limited to 10 million, but those skilled in the art will recognize that the limitations of the plurality of client devices 21 and server resources 3 could utilize the cellular networks, wireless data networks, internet or other broadband network which could scale to support greater than 10 million devices 21 and servers 3.

In the preferred method 212, context operation 201 may determine current location coordinates, time, date, direction and speed 225 and combinations thereof from the location determining unit 7. Operation 202 preferably determines the geographical region and historic time period of interest which preferably results in location coordinates defining the boundaries of the region and historic time intervals 223, said boundaries are preferably in the range of 100 feet to 5000 miles. Said historic time intervals preferably may extend 20 years into the past relative to current time; however, those skilled in the art will recognize the historic time intervals 223 could extent to the duration for which records were maintained and should be considered within the scope of the present invention. Furthermore, the historic time intervals 223 could actually extend into the future relative to current time preferably 20 years for retrieving records which may include estimated and predicted patrol schedules, patrol locations, enforcement profiles, and properties presented in Table 1, and combinations thereof.

The database retrieve operation 203, preferably utilizes the regions and times of interest 223 to access the historical databases 2, 4 and real time database 5, 30 to retrieve a plurality of records derived from traffic law enforcement citations and encounters, and records of estimated and predicted patrol schedules, patrol locations, and enforcement profiles and combinations thereof 222. The plurality of records 222 is preferably limited to the records in the region and time interval of interest 223 and is typically less than 100 million records but those skilled in the art will recognize as the length historical records databases increase and the region of interest increases, the number of records may also increase and should be considered within the scope of the present invention. The plurality of records 222 may consist of record entries similar to Equation1, Equation 1a, and Table 1 and any combinations of the individual subfields thereof, referred to as database entry (dbe). Other options for storing the content or dbe records in historical databases 2, 4 and 5, 30 are possible which may be more efficient and should be considered within the scope of the present. Additionally or alternatively, databases 2, 4, 5, 30 may store dbe records which may be predicted traffic law enforcement property fields in Table 1 and combinations thereof. Storing predicted enforcement profiles, locations and schedules of traffic law enforcement provides the benefits of reduced processing requirements of the HPPU 1, 18 and reduced database 2, 4, 5, 30 sizes. Additionally, in a preferred embodiment the database retrieve operation 203 may retrieve a plurality of historic traffic flow volume and velocity database 16, 23 records and roadway map database 15,17 entries, for the region and timeframe of interest 223, and provide on 222.

In a preferred embodiment, predicted traffic law enforcement patrol locations can be determined by the patrol location estimator operation 204, predicted traffic law enforcement schedules can be determined by the patrol schedule estimator operation 205, and estimated enforcement profile can be determined by the patrol profile estimator operation 206 by utilizing the dbe 222, and optionally the traffic flow and map database entries 222.

In a preferred embodiment, operations 204, 205, 206 may all be present; however, in other preferred embodiments any combination or subset of operations 204, 205 and 206 may be present. Operations 204, 205, 206 preferably process the plurality of historical and real time data base entries 222 provided from databases 2,4,5,30,16,23 to produce statistical estimates of past and present patrol locations in operation 204, estimates of schedules in operation 205 and enforcement profiles in operation 206, and time extrapolate statistical estimates to produce predicted patrol locations 215 in operation 204, patrol schedules 213 in operation 205 and enforcement profiles 214 in operation 206.

The Indication operation 207 may accept and present any combination of the predicted patrol schedules 213, locations 215, profiles 214, historical database records 222, and current location, date, time and velocity 225 of apparatus 14. Additionally, Indication operation 207 may enunciate an audio or visual indication or alarm if apparatus 14 location and velocity 225 is approaching predicted patrol locations 215 or is within predicted patrol schedules 213 with historical patrol location or historical patrol schedule correlation. Additionally, Indication operation 207 may enunciate an audio or visual indication or alarm if the apparatus 14 location, time and velocity 225 are approaching a location with a statistically significant chance of encountering traffic law enforcement as indicated by the predicted patrol location 215 and with a predicted patrol schedule 213 and combinations thereof.

In another preferred embodiment, operation 203 may provide records of historic citation and encounter records to operation 207, over the region of interest 223, which may present the historical citation information 222. Additionally, any combination of record fields of Equation 1, 1a or Table 1 maybe be presented by operation 207. In a preferred embodiment the traffic enforcement profiler method 212 provides historic traffic law enforcement data 222. From the presented historic data 222, a user could preferably interpret, and or estimate patrol locations, schedules and enforcement profile including enforced speed limits. Those skilled in the art will recognize the historic records 222 could further be filtered by a user and the properties the records could be visually encoded to communicate the enforcement profile and should be considered within the scope of the present invention.

Estimating Patrol Locations, Schedules, and Enforcement Profiles of Traffic Law Enforcement In a preferred embodiment of the present invention, apparatus 14 may utilize the principles of statistical analysis and probability theory in estimating the properties of traffic law enforcement presented in Table 1. In particular, traffic law enforcement properties of Table 1 may be modeled as a stochastic process and the predicted patrol locations, schedules and enforcement profiles could be considered random variables. Records derived from historic traffic law enforcement citations and encounters can be considered events of the underlying stochastic process and utilized to estimate the probability distribution of patrol locations, schedules, patrol profiles and the properties presented in Table 1 to provide a historical characterization of traffic law enforcement properties as a function of time and location. Additionally, the historic records of traffic law enforcement citations and encounters may be utilized to probabilistically predict the locations, schedules, patrol profiles, and properties of Table 1 of traffic law enforcement.

In a preferred embodiment, properties including those of Equation 1, derived from issued citations and encounters, which can be considered events of the traffic law enforcement stochastic process, may be correlated to estimate the statistical relationship and dependencies between said properties and enable predicting current or future events of traffic law enforcement which may include patrol locations, schedules and enforcement profiles. Correlation refers to any statistical relationship between two or more random variables or sets of events from a stochastic process. Equation 4a presents a general algorithm implemented by a preferred embodiment of apparatus 14. Equation 4a may determine the correlation between a plurality of random variables $X_1$, $X_2$, $X_N$, wherein UN represents the mean of the associated random variable and ON represents the variance of the associated random variable. E is the expected value operator. Random variables $X_1$, $X_2$, $X_N$ of traffic law enforcement may include patrol locations, schedules, enforcement profiles and properties of presented in Table 1 and Equation 4a, may determine the correlation and hence statistical predictability of patrol locations, schedules, and enforcement profiles.

$$\rho_{X_1,X_2 \ldots X_N} = corr(X_1, X_2 \ldots X_N) = \frac{E[(X_1 - \mu_{X_1})(X_2 - \mu_{X_2}) \ldots (X_N - \mu_{X_N})]}{\sigma_{X_1} \sigma_{X_2} \ldots \sigma_{X_N}}$$

Equation 4a. A preferred multi-variable correlation method to predict events of traffic law enforcement.

Equation 4a1 may utilize a plurality of observed events $C_1$, $C_2$, $C_N$ of random variables $X_1$, $X_2$, $X_N$ to determine the sample correlation which approximates the correlation of Equation 4a, which may statistically predict patrol locations, schedules and enforcement profiles.

$$\rho_{X_1,X_2 \ldots X_N} \approx r_{C_1 C_2 C_N}(\tau_1, \ldots \tau_N) = \int_{\varphi} C_1(\varphi) C_2(\tau_1 + \varphi) C_N(\tau_1 + \tau_N + \varphi) d\varphi$$

Equation 4a1. A preferred multi-variable sample correlation method to predict events of traffic law enforcement Equation 4a1 is presented in continuous integral form; however, discrete versions of Equation 4a1 are also possible and should be considered within the scope of the present invention. In Equation 4a1, the plurality of observed events $C_1$, $C_2$, $C_N$ could be derived from encounters and citations of traffic law enforcement 222 and the properties associated with each citation as presented in Equation 1. The φ operator may represent the variable to perform correlation over and could be any combination of time, location, citation speed, citation type or any combination of properties of Equation 1. $T_1$, $T_N$ may be considered the plurality of functions for which the correlation is computed and could also be any combination of time, location, citation speed, and any combination of properties of Equation 1. Relative maximum in the correlation result Equation 4a1, may be identified as periodic patrol properties as a function of $T_1$, $T_N$ and could be time extrapolated into the present or future to predict events of traffic law enforcement including patrol locations, schedules, enforcement profiles and the properties provided in Table 1.

Statistical analysis of the properties of event records, derived from issued citations and encounters of traffic law enforcement, preferably including the properties of Equation 1, can be utilized for characterizing the properties of the traffic law enforcement stochastic process. More specifically, descriptive statistics principles can be utilized to quantitatively describe the historical characteristics of traffic law enforcement from the event records which may include determining the mean, variance, frequency, histogram, distributions, accumulations, minimum and maximum of properties derived from historical citation records including those of Equation 1. Further, statistical inference can be utilized to infer and predict the properties presented in Table 1, of traffic law enforcement, from historical encounters with and citation records of traffic law enforcement, which may include patrol locations, schedules, and enforcement profiles. Correlation is also a statistical measure which refers to a broad class of statistical relationships involving dependence between random variables. The following sections present preferred algorithms for utilizing correlation and statistical analysis to estimate patrol locations, schedules, and enforcement profiles of traffic law enforcement and may include the properties presented in Table 1.

Patrol Location Estimation—Operation 204

The patrol location estimator 204 preferably determines the locations where it is likely to encounter traffic law enforcement patrols. Table 1 provides a listing of estimated traffic law enforcement properties which may be provided by the current invention, and the estimation of Patrol Location and the Patrol Location Intensity properties of Table 1 may be determined by the Patrol Location Estimator operation 204. In a preferred embodiment, the patrol location estimator 204, may implement algorithms utilizing historic and or real time records similar to Equation 1, derived from traffic law enforcement citations and crowd sourced data 222 to predict patrol locations 215. In yet another preferred embodiment, the patrol location estimator 204 may utilize records similar to Equation 1a, of previously determined predicted patrol locations and location patrol intensity of traffic law enforcement patrols 222, to predict patrol locations and location patrol intensities 215.

A preferred method of the patrol location estimator 204 to determine patrol location estimates 215, calculates the correlation between a plurality of records 222 and identifies traffic law enforcement patrol locations. In a preferred embodiment of patrol location estimation operation 204, Equation 4a, 4a1 could be utilized to compute the location correlation between citation record 222 locations from Equation 1, possibly as a function of citation type, time, and direction. Relative maximum in the correlation result may be identified by the location estimation operation 204 as periodic patrol patterns at a location and can be time extrapolated into the present or future and hence predict patrol locations 215. In a preferred embodiment, the patrol location estimator 204 correlates a plurality of random citation events $C_1$, $C_2$, $C_N$ to optimize the accuracy of patrol location estimates 215; however, preferably said plurality of events to be correlated could include any combination of the following enumerated records 222 of Equation 1:

1) Citations issued at a location
2) Citations issued at a location and in a direction
3) Citations issued as a function of time at a location
4) Citations issued as a function of time at a location and in a direction
5) Traffic flow volume as a function of time at a location
6) Traffic flow rate as a function of time at a location In another preferred embodiment, the patrol location estimator 204 can compute the auto correlation of the time sequence of citation records 222 at a plurality of locations limited to be within the region of interest 223 wherein the relative maxima of said auto correlation indicates the presence of periodic patrol patterns at said plurality of locations. Operation 204 can observe the relative maxima of said autocorrelation and determine locations where patrols occur and the periodic times at which said patrols occur and time extrapolate the periodic times of the patrols to predict locations of patrols at the present and or future times and provide said predicted patrol locations and times as indication 215. Equation 4b provides a preferred method of operation 204 for computation of the auto correlation of issued citations locations as a function of citation type and time.

$$\text{coorelation}(\text{type}, loc, \tau) = \int_{t=t1}^{t=t2} dbe(\text{type}, loc, t)dbe(\text{type}, loc, \tau - t)$$

Equation 4b. A preferred correlation method to estimate patrol locations

In equation 4b, the correlation can be computed for a citation type and or location and patrol interval time $\tau$, between a starting time $t_1$ and an ending time $t_2$. In a preferred embodiment, operation 204 can compute the correlation of equation 4b and identify relative maximums as a function of patrol interval time $\tau$ which indicate traffic law enforcement patrol locations and patrol intervals and provide said predicted patrol locations and times as indication 215.

In another preferred embodiment, the patrol location estimator 204 can compute the accumulation of citation records 222 at a plurality of locations between a time interval $t_1$ and $t_2$ and determine historic patrol locations as locations with accumulation results above a threshold and or accumulation results which are relatively higher than other locations. Operation 204 can predict current and future patrol locations from historic patrol locations and provide said predicted patrol locations as indication 215.

In a preferred embodiment, the patrol location estimator 204 computes the accumulation 215 of historical and or real time traffic law enforcement encounters preferably as a function of time, location, and by type of citation or encounter type. The accumulation 215 at each location may be interpreted relative to other locations to determine patrol location estimates preferably as the locations with higher relative accumulations. Alternatively or additionally, the patrol location estimation operation 204 could preferably compare the accumulation 215 at each location to a threshold to determine patrol location estimates preferably as the locations with accumulations greater than the threshold. A preferred accumulation algorithm is shown in Equation 4; however, other algorithms to compute the citation location accumulation are possible and should be considered within the scope of the present invention. Equation 4 accumulation is algorithmically equivalent to the auto correlation with time shift of zero and computed at a plurality of locations.

$$\text{accumulation}(\text{type}, loc, t) = \sum_{t=t1}^{t=t2} dbe(\text{type}, loc, t)$$

Equation 4. A preferred computation of encounter location accumulation.

The following terms of equation 4 are defined:

Accumulation (loc)—total occurrences of encounters at a given location loc, time t, and of type Loc—location, and may preferably include direction dbe(type, loc, t)—data base entry at time t and location loc and of type.

t—time t1—start time and date of interval for calculating the total number of encounters t2—end time and date of interval for calculating the total number of encounters Equation 4 preferably computes the total number of occurrences of citations and or encounters issued at a given location loc within a specified time period t1 to t2 referred to as citation accumulation and of a type of citation. Operation 204 preferably computes the citation location accumulation for each location 223 to produce a complete histogram of citation accumulations at each location loc and for each citation type. Preferably the time period t1 to t2 is large enough to give an accurate representation of issued citations at a given loc, said period t1 to t2 being preferably in the range of 1 minute to several years.

In another preferred embodiment, the patrol location estimator 204 may compute the patrol location estimates utilizing traffic flow database entries 16 and or 23 to compute the ratio of accumulated traffic encounters as a function of time, location and type to traffic volume as a function of time and location to normalize said accumulated traffic law enforcement encounters and preferably enable more accurate prediction of estimated patrol locations. Equation 4c demonstrates an example algorithm for computing the citation accumulation normalized by traffic volume.

$$\text{normalized\_accumulation}(\text{type}, loc, t) = \left(\sum_{t=t1}^{t=t2} dbe(\text{type}, loc, t)\right) \Big/ \text{traffic\_flow}(loc, t)$$

Equation 4c. A preferred computation of normalized encounter location accumulation.

The following terms of equation 4 are defined:

Normalized Accumulation (type, loc, t)—total occurrences of encounters at a given location loc, time range t2 to t1, and of type Traffic_flow(loc,t)—traffic volume at location loc and time interval t2 to t1.

Loc—location and may preferably include direction dbe(type, loc,t)—data base entry at time t and location loc of type t—time t1—start time and date of interval for calculating the total number of citations t2—end time and date of interval for calculating the total number of citations In yet another preferred embodiment, the patrol location estimator 204 may utilize records similar to Equation 1a, of previously determined predicted locations of traffic law enforcement patrols 222, to predict patrol locations 215.

The predicted patrol locations produced by the patrol location estimator 204 are provided on indication 215.

Patrol Schedule Estimator Operation 205

In a preferred embodiment, the patrol schedule estimator 205 predicts the schedules of traffic law enforcement patrols at a plurality of locations within the region of interest 223. Table 1 provides a listing of estimated traffic law enforcement properties which may be provided by the current invention, and the Estimated Patrol Schedule property of Table 1 may be determined by the Patrol Schedule Estimator operation 205. The patrol schedule estimator 205 could implement algorithms utilizing historic and real time records derived from traffic law enforcement citations and crowd sourced data 222 to predict patrol schedules. In another preferred embodiment, the patrol schedule estimator 205 could compute the time-location correlation Equation 4a, 4a1 of records similar to Equation 1, which are derived from historic traffic law enforcement citations and crowd sourced data 222, to estimate traffic law enforcement patrol schedules 213, preferably as a function of location and by type of citation or encounter type. In yet another preferred embodiment, the patrol schedule estimator 205 may utilize records similar to Equation 1a, of previously predicted schedules of traffic law enforcement patrols 222, to predict traffic law enforcement patrol schedules 213, at a plurality locations within the region of interest 223.

In a preferred embodiment, the patrol schedule estimator 205 preferably computes the time-location correlation of encounters 213 retrieved from database 2, 4, 5, 30 and preferably uses the time-location correlation of historical encounters to predict patrol schedules at a plurality of locations within the region of interest 223. The patrol schedule estimator 205 could implement the correlation method of Equation 4a, 4a1 and the autocorrelation method of Equation 4b to estimate patrol schedules. In equation 4b, the correlation can be computed as a function of citation type and or location and patrol interval time T, between a starting time $t_1$ and an ending time t2. In a preferred embodiment, the patrol schedule estimator operation 205 can compute the correlation of equation 4a1 or 4b and identify relative maximums as a function of patrol interval time T which indicates traffic law enforcement patrol locations and patrol intervals. From said patrol intervals T, the patrol schedule estimator operation 205 can infer the historic schedules of traffic law enforcement and time extrapolate said historic schedules to predict current and future schedules of traffic law enforcement and provide said predicted patrol locations and associated patrol schedules as indication 213.

Figure 3:
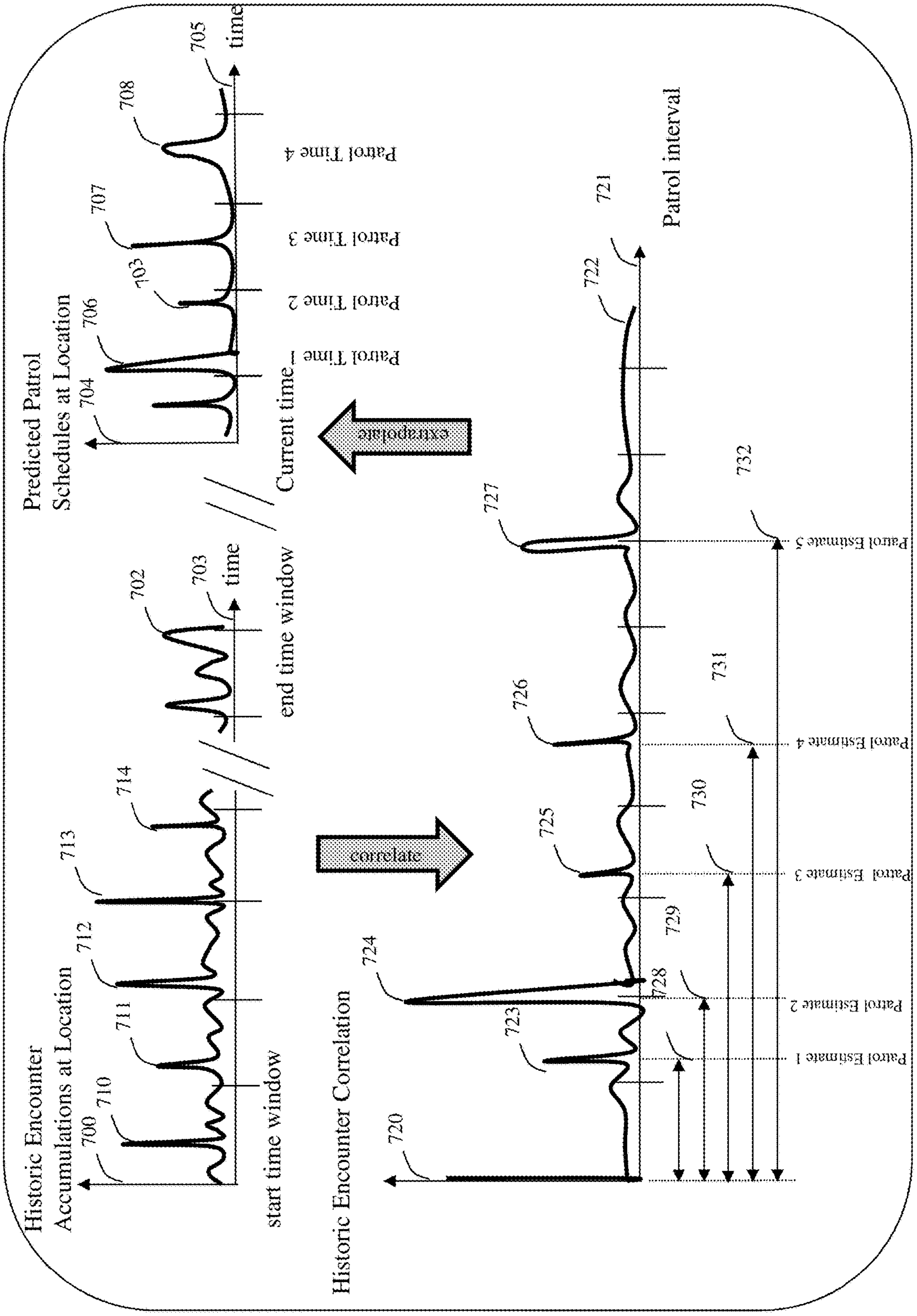

FIG. 3 graphically demonstrates a preferred correlation method of patrol schedule estimator 205 for estimating traffic law enforcement patrol schedules and locations. FIG. 3 shows a representative plot of the accumulation of traffic law enforcement encounters 700 at a location as a function of time and demonstrates a preferred method of correlation to derive patrol schedule estimates 720 and time extrapolation to infer and predict patrol schedules at present and future times 704. Time instances where there is an increase in law enforcement encounters are shown as encounter accumulation maximums 710, 711, 712, 713, 714 and indicate possible times where there may be increased patrols. Graph 720 may present the result of correlating the encounter accumulation 700 as a function of time which yields the encounter correlation result 720 with maxima 723, 724, 725, 726, 727 indicating the presence of periodic patrol patterns in historic encounter accumulations and provides an estimated patrol schedule. The amplitude of correlation 720 provides an indication of reliability of the predicted patrol schedule at said location and time, while the width of the correlation maxima 723,724,725, 726, 727 provides an indication of the time variance and duration of patrol interval. From the correlation maxima 723,724, 725, 726, 727 predicted patrol schedules are provided and can be time extrapolated to create estimated current and future patrol schedules 704 at said location. The maxima 706, 703, 707, 708 of the predicted patrol schedules 704 provide specific statistically probable patrol times and the amplitude of the maxima 706, 703, 707, 708 provide a relative indication of the likelihood of patrol and the width of said maxima provides an indication of the typical duration of the patrols or time uncertainty of the patrols at said location.

In a preferred embodiment, correlation of historic traffic law enforcement records could be performed over a period of minutes, hours, days, weeks or even years to provide estimates of traffic law enforcement patrol schedules. However, correlation of historic traffic law enforcement records over time intervals of 10 years or less is generally sufficient to produce reliable estimates of patrol schedules 213. The correlation results from historical law enforcement encounters can be time extrapolated to infer real time and future patrol schedules 213.

Conceptually various algorithms and equations can be employed by the patrol schedule estimator 205 to estimate patrol schedules from traffic law enforcement citation records and crowd encounter 222 and should be considered within the scope of the present invention. Additional preferred algorithms for estimating patrol schedules by computing the time-location correlation are shown in equation 5 and equation 5a. Equation 5a presents a preferred method of the patrol schedule estimator operation 205 for correlating records and encounters 222 as a function of location, patrol intervals and over a time period interest. Equation 5a may compute the encounter_correlation Equation 5a by auto correlating the database records 222 at a location and for a patrol time interval. The relative maximums of the encounter_correlation Equation 5a, correspond to periodic patrol patterns or schedules of traffic law enforcement of interval t_patrol at the associated location loc. In a preferred embodiment, the patrol schedule estimator operation 205 can observe said relative maximums of the encounter_correlation Equation 5a, and determines the periodic traffic law enforcement patrol intervals. The patrol schedule estimator 205 may time extrapolate said patrol intervals to predict the current and or future enforcement schedules at the associated locations and provides said predicted patrol locations and associated schedules as indication 213.

$$\text{encounter\_correlation}(loc \pm \Delta\alpha, \text{t\_patrol}) = \sum_{t=start}^{t=end} dbe(loc \pm \Delta\alpha, t \pm \Delta\varepsilon)dbe(loc \pm \Delta\alpha, t \pm \Delta\varepsilon - \text{t\_patrol})$$

Equation 5a. A preferred algorithm for computation of encounter time-location correlation.

The following preferable terms of equation 5a are defined:

correlation(loc, t_patrol)—the correlation of encounters at location loc and patrol interval t_patrol Loc+/−Δα—location of said violation within +/−Δα distance, Δα preferably ranges from 100 feet to 50 miles. Loc preferably also includes direction.

dbe(loc+/−Δα, t+/−Δε+/−t_patrol)—represents a database entry which has a matching location loc and issue time Δt+/−Δε.

tstart—the earliest time for calculating correlation time duration.

tend—the last time for calculating correlation time duration.

t+/−Δε—time of said violation within +/−Δε time, Δε preferably ranges from 1 minute to 1 day.

Equation 5, is yet another preferred algorithm for estimating patrol schedules by correlating the database entries as a function of time and location.

$$\text{encounter\_correlation}(loc + \Delta\alpha, \Delta t) = \sum_{n=n\,\min}^{n\,\max} dbe(loc + \Delta\alpha, n\Delta t + \Delta\varepsilon)$$

Equation 5. Preferred algorithm for computation of encounter location-time correlation.

The following preferable terms of equation 5 are defined:

correlation(loc, Δt)—the total correlation of citation locations at periodic times Δt Loc+Δα—location of said violation within +/−Δα distance, Δα preferably ranges from 100 feet to 50 miles. Loc preferably also includes direction.

dbe(loc, nΔt+Δε)—represents a database entry which has a matching location loc and issue time nΔt+Δε.

Nmin—the earliest index for calculating correlation time duration.

Nmax—the last index for calculating correlation time duration.

nt+Δε—time of said violation within +/−Δε time, Δε preferably ranges from 1 minute to 1 day.

Equation 5 preferably computes the total number of periodic occurrences of citations issued at a given location loc at the periodic times starting at time nmin *Δt+Δε·to nmax*Δt+Δε. This could be accomplished by accessing the database records 222 dbe and summing the number of entries with matching loc and time n*Δt+Δε. The occurrence of each matching dbe preferably has a weight of one. Said periodic times n*Δt+Δε could have a Δε term added which functions to allow a dbe with matching loc and in the span of +/−ε to match. Δε preferably has a span of 1 minute to 24 hours such that any dbe with a matching location loc, and issue time nΔt within the said span Δε would preferably produce a positive match result. The patrol schedule estimator 205 preferably repeats computation of Equation 5 for each location 223 in the geographic region of interest. Furthermore, the patrol schedule estimator operation 205 preferably repeats computation of equation 5 for different time spacing intervals Δt preferably ranging from one hour to one year in an attempt to identify periodic correlations between issued citations times and locations. Said citation location-time correlation results 213 of the patrol schedule estimator 205 are preferably passed to the Indication operation 207.

Figure 4:
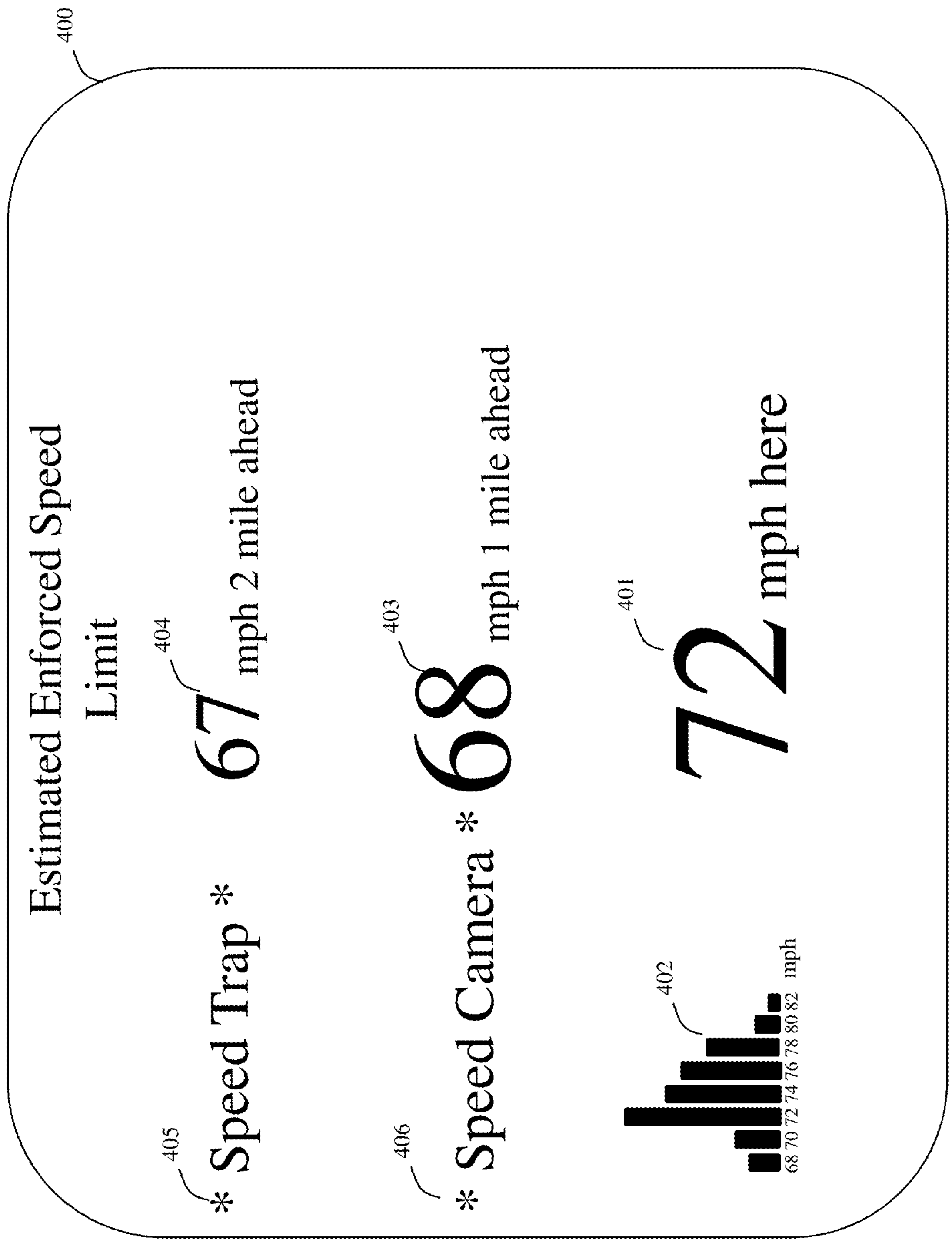

The algorithms presented in Equations 4a, 4a1, 4b, 5, 5a and FIG. 4 are examples of preferred methods to estimate and predict traffic law enforcement patrol schedules from historic traffic law enforcement and crowd sourced records; however, other algorithms to estimate traffic law enforcement patrol schedules are possible but should be considered within the scope of the present invention including using records of previously determined, estimated and predicted traffic law enforcement patrol schedules.

In yet another preferred embodiment, the patrol schedule estimator 205 may utilize records similar to Equation 1a, of previously determined predicted locations of traffic law enforcement patrols 222, to predict patrol schedules 215.

Patrol Enforcement Profile Estimator Operation 206

The patrol enforcement profile estimator, operation 206, preferably determines the enforcement profile of traffic law enforcement. Table 1 provides a listing of estimated traffic law enforcement properties and patterns which may be provided by the current invention, and the estimation of Patrol Profile properties of Table 1 may be determined by the Patrol Enforcement Profiler operation 204. In a preferred embodiment, the patrol enforcement profile estimator 206, determines the traffic law enforcement profile 214 at a plurality of locations within the geographic region and time intervals of interest 223 utilizing database records derived from historic traffic law enforcement citation records and or crowd sourced encounters 222. In yet another preferred embodiment, the patrol profile estimator 206 utilizes records, similar to Equation 1a and Table 1, of previously predicted profiles of traffic law enforcement patrols 222, to predict traffic law enforcement patrol profiles 214, at a plurality of locations within the region of interest 223.

In a preferred embodiment, the traffic law enforcement profile estimator 206 may estimate traffic law enforcement profile properties 214 at a plurality of locations and times within the region and time frame of interest 223 which are summarized in Patrol Profile of Table 1 and may include any combination of: enforced speed limit, speed trap location, red light camera location, speed camera location, aircraft speed limit enforced location, histogram of issued citation types, location citation density, enforcement profile of traffic laws, histogram of citation speeds for speeding citations, number of issued citations, the distribution of enforced traffic laws, probability of receiving a traffic citation, probability of encountering traffic law enforcement, and the austerity with which traffic laws are enforced.

The austerity with which traffic laws are enforced may comprise those in Table 1 including enforcement leniency profile, speed limit enforcement austerity relative to average traffic flow velocity, location enforcement austerity relative to average traffic volume, speed limit enforcement austerity relative to average traffic volume and other austerity metrics and combinations thereof, and indicate said plurality of profile properties on 214. Those skilled in the art will recognize that additional traffic law enforcement profile characteristics can be derived from historic citation records and could be implemented with the programmable patrol profile estimator 206, and should be considered within the scope of the present invention.

In a preferred embodiment the patrol profile estimator 206, may utilize correlation methods analogous to Equation 4a, 4a1 and statistical analysis to estimate the historical patterns and properties provided in Table 1, of traffic law enforcement from historical records of citation and encounters 222. The patrol profile estimator 206 may correlate properties derived from citation records 222, analogous to Equation 1, which could include citation record: violation speed, time, date, location, travel direction, citation type, traffic volume, and average traffic velocity to estimate historical and predicted enforcement properties of traffic law enforcement 214, as presented in Table 1, at the current location 225 or surrounding locations within the region of interest 223 of apparatus 14.

In yet another preferred embodiment, the enforcement profiler 206 may access previously computed predicted traffic law enforcement profiles 222 analogous to Equation 1a or Table 1, at a plurality of locations within the region of interest 223, to provide predicted enforcement profile properties presented in Table 1. Alternatively or additionally, the enforcement profiler 222 may access historic records derived from issued citations and crowd sourced law enforcement encounters 222 analogous to Equation 1, at a plurality of locations with the region of interest 223, to compute the predicted enforcement profile properties of Table 1. The enforcement profiler 206 may provide combinations of the enforcement profile properties in Equation 1a, and Table 1 and more specifically, the enforcement profiler 206, may provide any combinations of the following enforcement profiles properties:

Enforcement Profile Properties:

Enforced Speed Limit

In a preferred embodiment the enforcement profile estimator 206 may estimate the enforced speed limit at a plurality of locations and time periods within the region and time interval of interest 223 and provide an indication of the estimated enforced speed limit on 214. The enforced speed limit 214 is equal to or higher than the posted speed limit and is preferably the maximum speed at which there is not a statistically unacceptable chance of being cited for speeding by traffic law enforcement. The enforced speed limit at a location may vary with the time of day, direction of travel, traffic flow volume and time of month or year and other events. The patrol profile estimator 206, may utilize Equations 4a, 4a1 to correlate citation records 222 and determine the historical patterns and relationship of enforced speed limit to location, travel direction, time, date, traffic volume, and average traffic velocity. The patrol profile estimator 206 may also time extrapolate from the historical patterns of enforced speed limit to infer the enforced speed limit 214 at the location, time, date, and travel direction 225 of apparatus 14.

In a preferred embodiment, the patrol enforcement profiler 206, can compute a histogram of citation speeds from records 222 of issued traffic law enforcement citations at location 225 of apparatus 14 or a plurality of locations within the region of interest 223. Said histogram of citation speeds provides a representation of speed limit enforcement profile for interpretation by a user and or the histogram could be further processed by the enforcement profiler 206 to determine an estimate of the enforcement speed limit 214 possibly as the maximum positive slope of the histogram.

In another preferred embodiment, the enforcement profiler operation 206 may determine the estimated enforced speed limit 214 as the minimum speed for which a speeding citation was issued from records 222 of issued speeding citations at the corresponding location and preferably time. Furthermore, the enforcement profiler operation 206 may additionally or alternatively estimate the enforced speed limit 214 as the average of citation speeds of records 222 for which speeding citations were issued at the corresponding location and preferably time. In a preferred embodiment, the enforcement profiler operation 206 may also calculate the variance of the violation speeds of speeding citations records 222 at location 225 of apparatus 14 or a plurality of locations 223 which represents the variability and uncertainty in the estimated enforced speed limit traffic law enforcement profile.

In addition to the presented methods of estimating the enforced speed limit, the enforcement profiler 206 is preferably programmable and may implement additional methods of estimating said enforced speed limit from historical records of traffic law enforcement citations and crowd sourced encounters which should be considered within the scope of the current invention. The traffic law enforcement profiles computed by operation 206 are preferably presented on 214.

In a preferred embodiment, the enforcement profiler 206 may calculate the mean citation speed from records of law enforcement citations and crowd sourced data 222 is shown in equation 6. Equation 6 can be derived from the generalized correlation Equations 4a, 4a1 as a constrained correlation and represents an algorithm to determine the mean citation speed for which speeding citations were issued as a function of time and location.

$$\text{mean\_citation\_speed}(loc, t) = 1/N \sum_{matching} dbe.speed(loc + \Delta\alpha, t + \Delta\varepsilon)$$

Equation 6. A preferred constrained correlation method to determine the mean citation speed The following terms of Equation 6 are defined:

Dbe.speed—represents database entry citation speed for which the speeding citation was issued.

Loc+Δα—location of said violation within +/−Δα distance, Δα preferably ranges from 100 feet to 10 miles.

T+Δε—time of said violation within +/−Δε time, Δε preferably ranges from 1 minute to 1 day.

1/N—N is the total number of dbe entries which match at said location and time

In a preferred embodiment, the enforcement profiler 206 may additionally or alternatively compute the citation speed variance as a function of location and time from traffic law enforcement records and or crowd sourced records 222 and an example algorithm is shown in equation 7. Said variance may indicate the uncertainty in the enforced speed limit or speed limit traffic law enforcement profile. Said citation variance results are indicated on 214 and are preferably provided to the present operation 207.

$$\text{citation\_speed\_variance}(loc, t) = 1/N\sum(dbe.speed(loc+\Delta\alpha, t+\Delta\varepsilon) - \text{mean\_citation\_speed}(loc, t))^{**}2$$

Equation 7. A preferred method to determine citation speed variance as a function of location and time.

Citation_speed_variance—variance of violation speed for which citations were issued at the specified location and time.

dbe.speed—database entry violation speed at the specified location and time.

Loc+Δα—location of said violation within +/−Δα distance, Δα preferably ranges from 100 feet to 10 miles.

T+Δε—time of said violation within +/−Δε time, Δε preferably ranges from 1 minute to 1 day.

1/N—N is the total number of dbe entries which match at said location and time

In yet another preferred embodiment, the enforcement profiler 206 may determine the enforced speed limit as minimum citation speed preferably as a function of location and optionally time and or direction from the records of traffic law enforcement citations and crowd sourced encounters 222 and a preferred algorithm is shown in Equation 8. Said minimum citation speed provides an estimation of enforced speed limit by traffic law enforcement as a function of location and optionally time and or direction and an estimation of the maximum speed to avoid receiving a citation.

$$\text{min\_citation\_speed}(\text{loc},t)=\text{floor}(\text{dbe.speed}(\text{loc}+\Delta\alpha,t+\Delta\varepsilon))$$

Equation 8. A preferred method to determine minimum citation speed.

Min_citation_speed—minimum violation speed for which a citation has been issued at the specified location and time.

dbe.speed-database entry violation speed at the specified location and time.

Loc+Δα—location of said violation within +/−Δα distance, Δα preferably ranges from 100 feet to 10 miles.

T+Δε—time of said violation within +/−Δε time, Δε preferably ranges from 1 minute to 1 day.

In equation 8, the floor function accesses dbe entries 222 at the location 225 of apparatus 14 or within the region of interest 223 and extracts the lowest speed field from the set of dbe records. Said minimum citation speed results 214 of operation 206 are preferably provided on 214.

The algorithms presented in Equation 6, 7, and 8 are examples of preferred methods to estimate traffic law enforcement profile from historic traffic law enforcement and crowd sourced records; however, other algorithms to estimate traffic law enforcement profile from records of traffic law enforcement citations and crowd sourced encounters 222 are possible and should be considered within the scope of the present invention.

Those skilled in the art will recognize that additional enforced speed limit profiling characteristics can be derived from historic citation records and crowd sourced encounters of traffic law enforcement 222, and databases 2, 4, 5, 30, and could be implemented with the programmable patrol profile estimator 206, and should be considered within the scope of the present invention. Additionally, those skilled in the art will recognize that the enforced speed limit estimate could be pre computed for locations 225, 223 and stored in the databases 2,4,5,30 and provided as records 222 which could then be provided by the patrol profile estimator 206 as indication 214.

Histogram of Citation Speeds:

In a preferred embodiment, the enforcement profiler 206 may determine a histogram of violation speeds for which citations 222 were issued at location 225 of apparatus 14 and at a plurality of locations within the time intervals and region of interest 223 and the citation violation speed histograms may be indicated on 214. The histogram may provide a statistical representation of the distribution of speeding citation violation speeds. The enforcement profiler 206, preferably determines the histogram of speeds at a location for which speeding citations were issued by indicating the distribution of the accumulation of each citation violation speed derived from records of issued speeding citations 222 at the corresponding citation location. The histogram of citation violation speeds may provide an enforcement profile of the enforced speed limit at the associated location. Furthermore, the enforcement profiler 206 may determine the speed at which the histogram of violation speeds achieves maximum positive slope to estimate the enforced speed limit 214. Additionally, those skilled in the art will recognize that histogram of citation speeds could be pre computed for locations 225, 223 and stored in the databases 2,4,5,30 and provided as records 222 which could then be provided by the patrol profile estimator 206 as indication 214.

Histogram of Enforced Traffic Laws:

In a preferred embodiment, the enforcement profiler 206 may determine a histogram of enforced traffic laws for which citations were issued at the location of apparatus 225 and a plurality of locations within the time intervals and region of interest 223 and the histogram of enforced traffic laws may be indicated on 214. The histogram of enforced traffic laws 214, may provide a statistical estimation of traffic laws which are enforce at a location. The enforcement profiler 206, preferably determines the histogram of enforced traffic laws at a location by indicating the distribution of the issued citation types from records of issued speeding citations 222 at the corresponding citation location. Citation types could consist of both moving and non-moving citation violation types such as speeding, expired registration, invalid display of license plate for example. The histogram of enforced traffic laws may provide an enforcement profile of traffic laws. Additionally, those skilled in the art will recognize that the histogram of enforced traffic laws could be pre computed for locations 225, 223 and stored in the databases 2,4,5,30 and provided as records 222 which could then be provided by the patrol profile estimator 206 as indication 214.

Enforcement Profile of Traffic Laws: In a preferred embodiment, the enforcement profiler 206 may estimate the enforcement profile of traffic laws which preferably consists of estimating combinations of the enforcement schedule and enforcement austerity for different types of traffic citations and provide an indication on 214. The enforcement profiler 206 may determine the enforcement profile of traffic laws at the location 225 of apparatus 14 or at a plurality of locations within the region and timeframe of interest 223 by computing the correlation between properties of historically issued citations 222 which may include combinations of issue time, date, location, citation warning, and citation type. In a preferred embodiment, the enforcement profiler 206 may utilize the method of Equation 4a, 4a1 to compute the correlation between citation properties to determine the enforcement profile of traffic laws. Additionally, those skilled in the art will recognize that the enforcement profile of traffic laws could be pre computed for locations 225, 223 and stored in the databases 2,4,5,30 and provided as records 222 which could then be provided by the patrol profile estimator 206 as indication 214.

Location Citation Density

The location citation density may be determined as the frequency of issued citations which are correlated to a geographic location and may provide a statistical indication of the extent to which a location is patrolled. In a preferred embodiment, the enforcement profiler 206 may determine the density of issued citations 222 at locations within the time intervals and region of interest 223 and provide an indication of the location citation density on 214. The enforcement profiler 206, preferably determines the citation density by accumulating the citations issued at each location at the current location 225 or at locations within the region of interest 223 which are derived from records of issued citations 222 and may be normalized by traffic volume and may provide an indication of location patrol intensity. The location citation density could be determined as a function of citation type and time may provide a geographical enforcement profile. Additionally, those skilled in the art will recognize that location citation density could be pre computed for locations 225, 223 and stored in the databases 2,4,5,30 and provided as records 222 which could then be provided by the patrol profile estimator 206 as indication 214.

Speed Trap Enforcement Location:

In a preferred embodiment, the enforcement profiler 206 may utilize combinations of records of historic issued citations and crowd sourced encounters 222 to predict the locations of speed traps within the region and time intervals of interest 223 and provide an indication on 214.

In a preferred embodiment, the enforcement profiler 206 may determine the location of estimated speed traps as locations with any statistical combination of: a region with a statistical increase in location correlation of issued citations relative to surrounding regions, an increase in location citation density relative to surrounding areas, drop in estimated enforced speed limit, an increase in probability of a vehicle having an encounter with traffic law enforcement, or an increase in relative ratios of issued traffic citations to traffic volume that exceed a programmable threshold relative to the ratios of issued traffic citations to traffic volume in surrounding locations. Furthermore, in a preferred embodiment, the enforcement profiler 206, in addition to predicting the location of speed traps, may also predict the schedules of speed trap enforcement by utilizing the patrol schedule estimates 213 from the patrol schedule estimation 205. Additionally, or alternatively the schedule of speed trap enforcement at speed trap locations can be predicted by determining said ratios of issued traffic citations 222 to traffic volume at historic times and locations and then correlating said ratios as a function of time to identify patrol schedules which are time correlated, and then time extrapolating said correlation to predict said speed trap enforcement schedules.

Those skilled in the art will recognize that additional speed trap detection profiling characteristics can be derived from historic citation records and could be implemented with the programmable patrol profile estimator 206, and should be considered within the scope of the present invention. Additionally, those skilled in the art will recognize that locations of speed traps could be pre computed for locations 225, 223 and stored in the databases 2,4,5,30 and provided as records 222 which could then be provided by the patrol profile estimator 206 as indication 214.

Aircraft Speed Enforcement Location:

In a preferred embodiment, the enforcement profiler 206 may utilize combinations of records of historic issued citations and crowd sourced encounters 222 to predict the locations of aircraft speed limit enforcement within the region and time intervals of interest 223 and provide an indication on 214.

In a preferred embodiment, the enforcement profiler 206 may determine the location of estimated aircraft speed limit enforcement locations with any combination of: a region with a statistical increase in location correlation of issued citations relative to surrounding regions, relative to surrounding areas an increase in location citation density, drop in estimated enforced speed limit, an increase in probability of a vehicle having an encounter with traffic law enforcement, or an increase in relative ratios of issued traffic citations to traffic volume that exceed a programmable threshold relative to the ratios of issued traffic citations to traffic volume in surrounding locations. Additionally, or alternatively, the enforcement profiler 206 may determine locations where the speed limit is enforced by aircraft by examining the citation type of citation records presented in Equation 1 as being issued by aircraft enforcement and utilizing the citation location correlation as the location of the aircraft speed limit enforced location.

Furthermore, in a preferred embodiment, the enforcement profiler 206, in addition to predicting the location aircraft speed limit enforcement, may also predict the schedules of aircraft speed limit enforcement by utilizing the patrol schedule estimates 213 from the patrol schedule estimation 205. Additionally, or alternatively the schedule of aircraft speed limit enforcement at patrolled locations can be predicted by determining said ratios of issued traffic citations 222 to traffic volume at historic times and locations and then correlating, analogous to Equation 4a, 4a1, said ratios as a function of time to identify patrol schedules which are time correlated, and then time extrapolating said correlation to predict said aircraft speed limit enforcement schedules.

Those skilled in the art will recognize that additional aircraft speed limit enforcement detection profiling characteristics can be derived from historic citation records and could be implemented with the programmable patrol profile estimator 206, and should be considered within the scope of the present invention. Additionally, those skilled in the art will recognize that locations of aircraft speed limit enforcement could be pre computed for locations 225, 223 and stored in the databases 2,4,5,30 and provided as records 222 which could then be provided by the patrol profile estimator 206 as indication 214.

Red Light Camera Enforced Intersection:

In a preferred embodiment, the enforcement profiler 206 may utilize combinations of records of historic issued citations and crowd sourced encounters 222 to predict the locations of intersections with red light camera enforcement within the region and timeframe of interest 223 and provide an indication on 214. The enforcement profiler 206 may determine locations of intersections equipped with red light camera enforcement by examining the citation type of citation records presented in Equation 1 as being issued by automated red light camera enforcement and utilizing the citation location correlation as the location of the red light enforced intersection. Alternatively or additionally, the enforcement profiler 206 may determine locations of intersections equipped with red light camera enforcement by observing the relative density of citations issued 222 at intersections located within the region and time frame of interest 223, and infer the locations of intersections equipped with red light camera enforcement as those with a number of citations issued of type similar to red light violation exceeding a programmable threshold greater than the number of issued citations of similar type at surrounding intersections. Additionally, red light camera enforced areas may be indicated by a region with a statistical increase in location correlation of issued red light violation citations relative to surrounding regions.

Those skilled in the art will recognize that additional red light camera enforced detection profiling characteristics can be derived from historic citation records and could be implemented with the programmable patrol profile estimator 206, and should be considered within the scope of the present invention. Additionally, those skilled in the art will recognize that red light camera locations could be pre computed for locations 225, 223 and stored in the databases 2,4,5,30 and provided as records 222 which could then be provided by the patrol profile estimator 206 as indication 214.

Speed Camera Enforced Location:

In a preferred embodiment, the enforcement profiler 206 may utilize combinations of records of historic issued citations and crowd sourced encounters 222 to predict the locations with speed camera enforcement within the region and time period of interest 223 and provide an indication on 214. The enforcement profiler 206 may determine locations of roadway equipped with speed camera enforcement by examining citation type of citation records presented in Equation 1 as being issued by automated speed camera enforcement and utilizing the citation location correlation as the location of the speed camera enforcement. Alternatively or additionally, the enforcement profiler 206 may determine locations of roadway equipped with speed camera enforcement by observing the relative location citation density of issued 222 on roadway located within the region and time frame of interest 223, and infer the locations of roadway equipped with speed camera enforcement as those with a number of citations issued of type similar to speeding violation exceeding a programmable threshold greater than the number of issued citations of similar type at surrounding roadway.

Those skilled in the art will recognize that additional speed camera enforced detection profiling characteristics can be derived from historic citation records and could be implemented with the programmable patrol profile estimator 206, and should be considered within the scope of the present invention. Additionally, those skilled in the art will recognize that speed camera locations could be pre computed for locations 225, 223 and stored in the databases 2,4,5,30 and provided as records 222 which could then be provided by the patrol profile estimator 206 as indication 214.

Enforcement Austerity

The enforcement austerity estimate provides a means to predict the amount of flexibility, leniency or austereness of traffic law enforcement in enforcing traffic laws and may include the Enforcement Leniency Profile, Speed Limit Enforcement Austerity and Location Enforcement Austerity.

Enforcement Leniency Profile

In a preferred embodiment, the enforcement profiler 206, may determine the enforcement leniency profile which is a statistical measure of the willingness of traffic law enforcement to issue warnings rather than citations, at the location of apparatus 225 or locations within the region and time intervals of interest 223 and provide an indication on 214. The enforcement profiler 206, preferably determines the enforcement leniency profile for citation types and is derived from the ratio of the number of citations issued 222 of a given type to the number of warnings issued 222 of said given type at each location and time interval. The enforcement leniency profile of issued citations may provide a geographical representation of enforcement tolerance for each type of citation.

Those skilled in the art will recognize that additional enforcement leniency profiling characteristics can be derived from historic citation records and could be implemented with the programmable patrol profile estimator 206, and should be considered within the scope of the present invention. Additionally, those skilled in the art will recognize the enforcement leniency profile could be pre computed for locations 225, 223 and stored in the databases 2,4,5,30 and provided as records 222 which could then be provided by the patrol profile estimator 206 as indication 214.

Speed Limit Enforcement Austerity Relative to Average Traffic Flow Velocity In a preferred embodiment, the enforcement profiler 206, may estimate the enforced speed limit austerity relative to the average flow velocity of traffic at the location of apparatus 225 or at a plurality of locations within the region of interest 223 and provide an indication on 214. The enforcement profiler may determine the speed limit enforcement austerity by correlating or comparing the average traffic flow velocity from historical records of traffic flow 222, contained in databases 16, 23 to traffic law enforcement issued citation speeds 222 at associated locations and times providing the enforced speed limit relative to the flow of traffic. Preferably the enforcement profiler 206 can compare the traffic flow rate with records of issued speeding citation velocities 222 and determine the estimated velocity at which traffic law enforcement issues citations at given times and locations relative to the average traffic flow velocity and may determine the austerity with which traffic law enforcement enforces the speed limit relative to average traffic flow velocities and volumes at given locations and times.

In another preferred embodiment, the enforcement profiler 206, may estimate the schedule of speed limit austerity relative to traffic flow velocities at the location 225 of apparatus 14 or at a plurality of locations within the region of interest 223 and provide an indication on 214. The enforcement profiler 206, preferably determines the difference between the historic traffic flow average velocity from databases 16, 23 at location 225 or plurality of said locations within 223 and the velocities at which historic citations have been issued at corresponding plurality of locations and times 222. At each location, the enforcement profiler may then cross correlate said differences as a function of time as in Equation 4a, 4a1 to estimate the enforced speed limit austerity schedule, and time extrapolate to predict current or future enforced speed limit austerity schedules at corresponding locations.

Those skilled in the art will recognize that additional speed limit enforcement austerity characteristics can be derived from historic citation records and could be implemented with the programmable patrol profile estimator 206, and should be considered within the scope of the present invention. Additionally, those skilled in the art will recognize the speed limit enforcement austerity could be pre computed for locations 225, 223 and stored in the databases 2,4,5,30 and provided as records 222 which could then be provided by the patrol profile estimator 206 as indication 214.

Location Enforcement Austerity Relative to Average Traffic Volume In a preferred embodiment, the enforcement profiler 206, may estimate the probability of receiving a citation relative to the average flow volume of traffic at location 225 or a plurality of locations within the timeframe and region of interest 223, which provides a measure of how much a location is patrolled and may be indicated on 214. The enforcement profiler may determine the location enforcement austerity relative to the average traffic volume by computing the probability of a vehicle receiving a citation at a location derived from the ratio of the number of citations issued at a location and time interval to the average flow volume of traffic at the corresponding location and time interval.

Those skilled in the art will recognize that additional location enforcement austerity profiling characteristics can be derived from historic citation records and could be implemented with the programmable patrol profile estimator 206, and should be considered within the scope of the present invention. Additionally, those skilled in the art will recognize the location enforcement austerity profile could be pre computed for locations 225, 223 and stored in the databases 2,4,5,30 and provided as records 222 which could then be provided by the patrol profile estimator 206 as indication 214.

Speed Limit Enforcement Austerity Relative to Average Traffic Volume In a preferred embodiment, the enforcement profiler 206, may estimate the enforced speed limit austerity relative to the average flow volume of traffic at the location of apparatus 225 or at a plurality of locations within the region of interest 223 and provide an indication on 214. The enforcement profiler may determine the speed limit enforcement austerity by comparing the average traffic flow volume from historical records of traffic flow 222, contained in databases 16, 23 to traffic law enforcement issued citation speeds 222 at associated locations and times providing the enforced speed limit relative to the flow of traffic. Preferably the enforcement profiler 206 can compare the traffic flow rate with records of issued speeding citation velocities 222 and determine the estimated velocity at which traffic law enforcement issues citations at given times and locations relative to the average traffic flow velocity and may determine the austerity with which traffic law enforcement enforces the speed limit correlated to the average traffic flow velocities and volumes at given locations and times.

Those skilled in the art will recognize that additional speed limit enforcement austerity profiling characteristics can be derived from historic citation records and could be implemented with the programmable patrol profile estimator 206, and should be considered within the scope of the present invention. Additionally, those skilled in the art will recognize the speed limit enforcement austerity profile could be pre computed for locations 225, 223 and stored in the databases 2,4,5,30 and provided as records 222 which could then be provided by the patrol profile estimator 206 as indication 214.

Those skilled in the art will recognize that in addition to the enforcement profiles outlined in the present invention, additional enforced profiles could be derived from historic records of citations and crowd sourced encounters and could be implemented with the programmable patrol profile estimator 206, and should be considered within the scope of the present invention.

Presentation of Enforcement Schedules, Locations, Profiles

Indication operation 207 provides a means to present the records of historical traffic law enforcement citations and crowd sourced events 222 and or estimated traffic law enforcement locations 215, schedules 213 and profile 214 to a user. In a preferred embodiment, indication operation 207 preferably accepts estimated patrol locations 215, estimated patrol schedules 213, the estimated traffic law enforcement profile 214, historic records of traffic law enforcement citations 222, and roadway map database entries 222 and apparatus speed, time, location and direction data 225 to present a representation which may include combinations of estimated traffic law enforcement locations 215, schedules 213, enforcement profile 214, historic traffic law enforcement records 222 and the traffic law enforcement properties presented in Table 1. Said presentation of estimated traffic law enforcement locations, schedules, enforcement profile and historic data may include audio 8 and or visual means 9.

Preferred Presentations

In a preferred embodiment, FIG. 4 presents a view 400 of display 9 preferably produced by the indication operation 207. Many variations of view 400 are possible, yet still provide combinations of historic and estimated traffic law enforcement characteristics which may include historic traffic law enforcement records 222, estimated traffic law enforcement locations 215, estimated schedules 213, and enforcement profile 214 and combinations thereof, and should be considered within the scope of the present invention. View 400 preferably presents a numerical representation of the estimated enforced speed limit 401 at the current location 225 of apparatus 14 and could optionally also present the estimated enforced speed limit at a plurality of points, preferably limited to less than 1000, further ahead or behind the direction of travel or in the vicinity of the apparatus 225. Items 403 and 404 indicate representative examples of the estimated enforced speed limit at a point 1 mile ahead and at a point 2 miles ahead respectively. In other preferred embodiments, fewer or additional estimated speed limits at other locations could be displayed over what is presented in the preferred view 400. Additionally or alternatively, a histogram or a distribution 402 could be presented at a plurality of locations, preferably less than 1000, which communicates the distribution of speeds at which citations 222 have been issued at said plurality of locations for the time period of interest 223. A histogram 402 provides a convenient means for a user to rapidly determine the enforcement profile and infer the enforced speed limit at locations of interest 223. Additionally or alternatively, view 400 may have indications for the locations of a plurality, preferably less than 1000, of estimated speed traps 405, or speed cameras 406 which were indicted on 215, 213 and 214. In a preferred embodiment, audio output 8 may enable audio indications of a plurality of estimated speed limits 401, 403, 404, and speed traps 405 in addition to or in place of displayed indications 401, 403, 404, 405 in which case display 9 may not be present.

Figure 5:
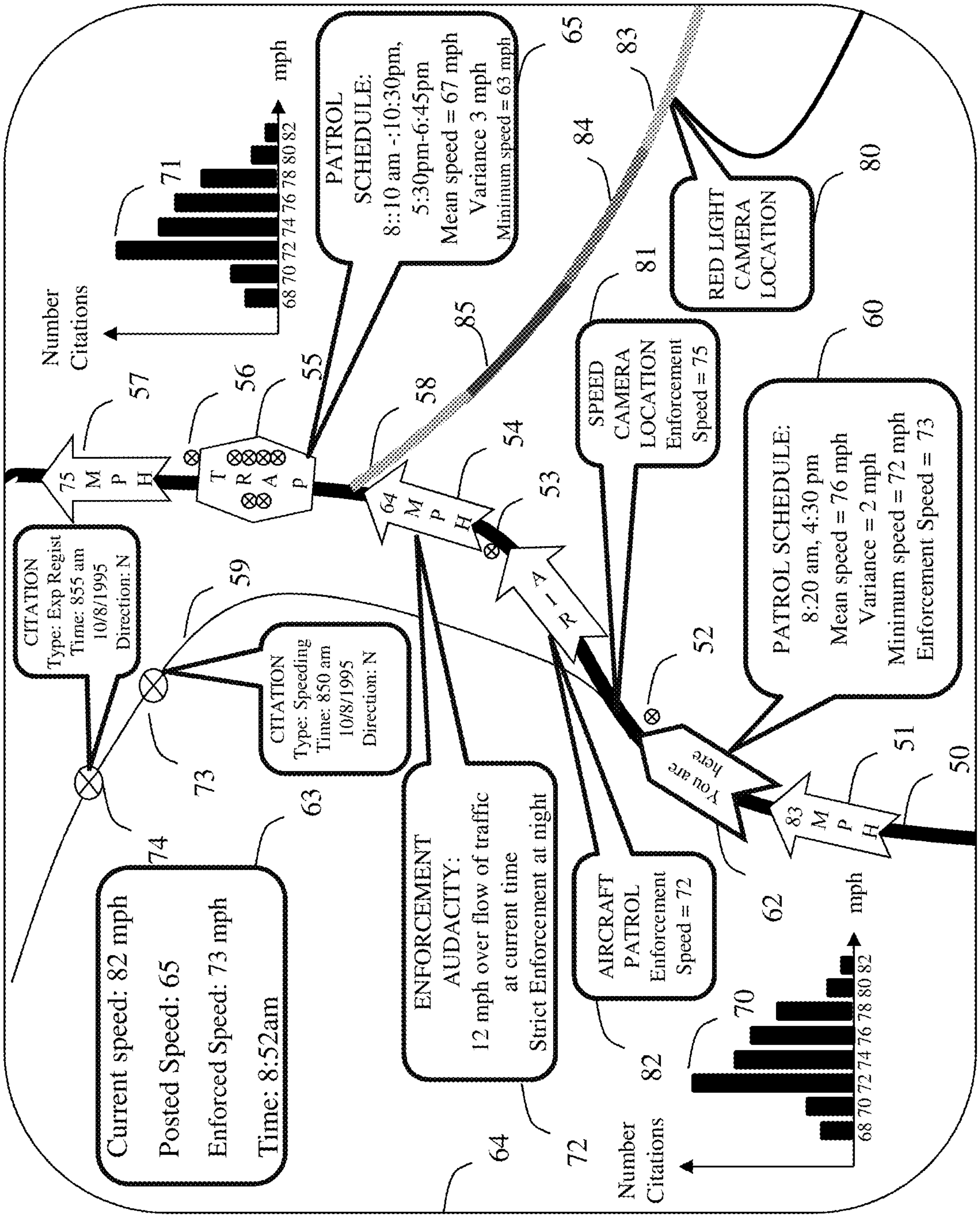

In yet another preferred embodiment, FIG. 5 presents another example view 64 of display 9. In view 64 of display 9, the indication operation 207 may combine a roadway map, preferably from databases 15 and or 17, with any combination of said predicted traffic law enforcement locations 215, schedules 213, enforcement profile 214 and historic traffic law enforcement records 222. Many variations of view 64 are possible, yet still provide combinations of estimated traffic law enforcement locations, schedules, and enforcement profile and historical traffic law enforcement data combined with a map of the roadway and should be considered within the scope of the present invention. View 64 demonstrates a preferred embodiment of many different display options for proving estimated and historic traffic law enforcement data to the driver, and preferably view 64 could be customizable to provide a subset or alterations of the data which the operator may select.

View 64 presents an example map of the roadway 50, 59, and 58. Overlaid on the roadway 50, is preferably the current location of the user 62, and optionally any of the current velocity, enforced speed limit, posted speed limit, the time 63 of the user 62. Preferably overlaid on the roadway 50 could be a plurality of indications 51, 54, and 57 showing estimated enforcement speed limit 214 derived from historical records of citations issued by traffic law enforcement or crowd sourced encounters at corresponding locations which were preferably calculated by the speed limit enforcement profiler 206. Said plurality of estimated enforcement speed limits 51, 54, 57 can vary and be correlated by time of day, date, direction, and location, traffic conditions and traffic flow rates and the patrol schedule can optionally be presented for corresponding locations 215. Furthermore, in a preferred embodiment, various methods could be utilized for conveying said plurality of enforcement speeds 51, 54, 57 including color or gradient coding sections of roadway to correspond to enforced speed limit ranges as indicated by 58, 83, 84, 85 or numerical representations 51, 54, 57. Additionally, various methods could be utilized for conveying location citation density which indicates the intensity of patrols at a location as could be indicated by 58, 83, 84, 85 wherein the shade or color of sections of roadway could encode the level of patrol intensity. Preferably overlaid on the roadway 50 could be a plurality of indications 72 showing estimated enforcement austerity 214 at corresponding plurality of locations. Said austerity 72 could preferably include providing combinations of the enforcement leniency profile, speed limit enforcement austerity relative to average traffic flow velocity, location enforcement austerity relative to average traffic volume, speed limit enforcement austerity relative to average traffic velocity and other austerity metrics of the present invention and those presented in Table 1.

Additionally, example symbols 52, 53, 55 and 56 may represent a plurality, of predicted patrol locations 215 over a time period and locations of interest 223, preferably determined by the Patrol Location Estimator 204, which identifies the locations where traffic law enforcement has historically issued citations. In a preferred embodiment of view 64, the locations of a plurality of historically issued citations or crowd sourced encounters 222, limited to the region of interest 223, may alternatively or additionally be displayed as shown by example symbols 73 and 74. Preferably the presentation of said plurality of historically issued citations 222 may be filtered by combinations of citation type, time, location and direction. In view 64, historically issued speeding citations 222 over a time period and region of interest 223 could be displayed as a histogram at a plurality of locations limited to the region of interest 223, examples of which include 70 and 71 which present the citation speed verses the number of speeding citations issued at said citation speed at said plurality of locations. Further, view 64 may identify a plurality of locations, within the region of interest 223, as speed traps, red light cameras, speed cameras, and aircraft enforced locations as indicated on 214, which preferably may be presented overlaid on view 64 as 55, 80, 81, 82 respectively. Other indications could be employed by the present operation 207 to identify speed traps, red light camera locations and speed camera locations and should be considered within the scope of the current invention.

View 64 can provide an indication of estimated traffic law enforcement patrol schedules 213 at a plurality of locations within the region of interest 223 as example indications 60, 65. Estimated patrol schedule indications 60, 65 preferably provide estimated patrol times, locations, and may preferably but not necessarily also provide any combinations of estimated enforced speed limit, the average speed at which citations were issued, citation variance from the mean, the minimum speed for which a speeding violation was issued, and a histogram of speeds for issued speeding citations. Alternative representations of 60,65 estimated traffic law enforcement patrol schedules 213 are possible and should be considered within the scope of the present invention.

The speed limit enforcement profile 214, patrol schedules 213, and patrol locations 215 can preferably be used in conjunction with road navigation planning to select a route between destinations with the fastest estimated enforcement speed limit to minimize driving time.

Additionally, the apparatus 14 and view 64 may preferably provide a set of historical citation and crowd sourced record database 2, 4, 5, 30 processing methods to enable searching, filtering, extracting, statistical processing, and viewing of historical traffic law enforcement citation and crowd sourced records preferably including histogram creation, distributions, scatter plots, tables and lists.

View 64 is an example of one realization to present the traffic law enforcement profiled information and historical records of citations and crowd source encounters, and many alterations of the above description are possible but still within the scope of the current invention.

While the above description contains many specifics, these should not be construed as limitations on the scope of the invention, but rather as an exemplification of one preferred embodiment thereof. It will be obvious to those skilled in the art that many modifications and alterations may be made without departing from the spirit and scope of the invention which should be determined not by the embodiments illustrated, but by the appended claims and their legal equivalents.

What is claimed is:

1. A system for providing properties of traffic law enforcement at one or more first locations to predict properties of traffic law enforcement at one or more geographically distinct second locations using statistical, correlation-based, and/or inferential predictive relationships derived from traffic law enforcement encounters associated with said first locations comprising:

a first database configured to provide first records of said properties of traffic law enforcement at said one or more first locations, wherein said first records of said properties of traffic law enforcement at said one or more first locations comprise one or more of a patrol location and/or a patrol schedule at said one or more first locations, and wherein said first records of said properties of traffic law enforcement at said one or more first locations are derived by applying one or more algorithms including filtering, statistical analysis, inference, correlation, extrapolation, and/or inferential prediction to properties of traffic law enforcement encounters from either one or both of (a) issued citation records of traffic law enforcement, and/or (b) crowd sourced traffic law enforcement encounters, at said one or more first locations, such that said statistical, correlation-based, and/or inferential predictive relationships between said properties of traffic law enforcement encounters at said first locations are determined;

a second database configured to provide second records of said predicted properties of traffic law enforcement at said one or more second locations, wherein said second records of said predicted properties of traffic law enforcement at said one or more second locations comprise a predicted patrol location and/or a predicted patrol schedule at said one or more second locations, and wherein said second records of said predicted properties of traffic law enforcement at said one or more second locations are derived by applying said one or more algorithms to said first records of said properties of traffic law enforcement at said one or more first locations;

a plurality of apparatuses, each comprising: (a) a Global Positioning System (GPS) configured to determine a location of each respective one of said plurality of apparatuses, and (b) a network interface configured to enable communication over a network between each respective one of said plurality of apparatuses, said first database, said second database, one or more predictive processors, one or more indicators, one or more user input systems, wherein said plurality of apparatuses are each configured to host one or more of said first database, said second database, said one or more predictive processors, said one or more indicators, and/or said one or more user input systems, and wherein at least one of said plurality of apparatuses hosts said first database, said second database, said one or more predictive processors, said one or more indicators, and said one or more user input systems;

wherein said one or more predictive processors are configured to: (a) determine when said location of each of said plurality of apparatuses is within a geographic region associated with said one or more first locations, (b) determine when said location of each of said plurality of apparatuses is within a geographic region associated with said one or more second locations without being in said geographic region associated with said one or more first locations, (c) when said location of each of said plurality of apparatuses is within a geographic region associated with said one or more first locations, retrieve at least a portion of said first records associated with said one or more first locations from said first database to determine said properties of traffic law enforcement at said one or more first locations, and (d) when said location of each of said plurality of apparatuses is within a geographic region associated with said one or more second locations without being in said geographic region associated with said one or more first locations, retrieve at least a portion of said second records associated with said one or more second locations from said second database to determine said predicted properties of traffic law enforcement at said one or more second locations;

wherein said one or more indicators are configured to present said properties of traffic law enforcement at said one or more first locations when said one or more predictive processors determine that said location of one or more of said plurality of apparatuses is within a geographic region associated with said one or more first locations, and present said predicted properties of traffic law enforcement at said one or more second locations when said one or more predictive processors determine that said location of one or more of said plurality of apparatuses is within a geographic region associated with said one or more second locations without being in said geographic region associated with said one or more first locations; and wherein said one or more user input systems operated by one or more human users are configured to control one or more of (a) what data is gathered, stored, and/or filtered within said first database and/or said second database for any of said one or more algorithms implemented by said one or more predictive processors, (b) any outputs of any of said one or more algorithms implemented by said one or more predictive processors utilizing said first records and/or said second records within said first database and/or said second database, (c) any aspects of presentation of any of said one or more algorithms implemented by said one or more predictive processors via said one or more indicators, and/or (d) any aspects of presentation of said properties of traffic law enforcement at said one or more first locations and/or of said predicted properties of traffic law enforcement at said one or more second locations, via said one or more indicators.

2. The system of claim 1, wherein said GPS of one or more of said plurality of apparatuses is further configured to determine one or more of a time and/or a date;

wherein said one or more predictive processors are further configured to determine when said time and/or said date is within a patrol schedule for said one or more first locations, and to determine said properties of traffic law enforcement at said one or more first locations from said retrieved first records corresponding to patrol schedules associated with said time and/or said date; and wherein said one or more predictive processors are further configured to determine when said time and/or said date is within a predicted patrol schedule for said one or more second locations, and to determine said predicted properties of traffic law enforcement at said one or more second locations from said retrieved second records corresponding to patrol schedules associated with said time and/or said date; and wherein said one or more indicators are further configured to present said properties of traffic law enforcement at said one or more first locations and said predicted properties of traffic law enforcement at said one or more second locations as a function of said location, said time, and/or said date.

3. The system of claim 1, wherein said GPS of one or more of said plurality of apparatuses is further configured to determine a direction of travel;

wherein said one or more predictive processors are further configured to determine when said direction of travel corresponds to a patrol location and/or patrol schedule for said one or more first locations, and to determine said properties of traffic law enforcement at said one or more first locations from said retrieved first records corresponding to patrol locations and/or patrol schedules associated with said direction of travel;

wherein said one or more predictive processors are further configured to determine when said direction of travel corresponds to a predicted patrol location and/or predicted patrol schedule for said one or more second locations, and to determine said predicted properties of traffic law enforcement at said one or more second locations from said retrieved second records corresponding to patrol locations and/or patrol schedules associated with said direction of travel; and wherein said one or more indicators are further configured to present said properties of traffic law enforcement at said one or more first locations and said predicted properties of traffic law enforcement at said one or more second locations as a function of said location and said direction of travel.

4. The system of claim 1, wherein said issued citation records of traffic law enforcement and/or said crowd sourced traffic law enforcement encounters comprise one or more of: vehicle direction, vehicle speed, vehicle location, vehicle type, vehicle color, encounter or issue time, and citation or encounter type.

5. The system of claim 1, wherein said properties of traffic law enforcement at said one or more first further comprise one or more of:

estimated enforced speed limit, posted speed limit, real-time location of traffic law enforcement patrols, predicted real time location of traffic law enforcement patrols, estimated speed trap enforced location, estimated speed limit enforcement by aircraft location, estimated speed camera enforced location, estimated red light camera enforced intersection, histogram of violation speed, histogram of enforced traffic laws, location citation density, location patrol intensity, enforcement austerity, enforcement leniency, records of issued citations of traffic law enforcement, and records of crowd sourced encounters with traffic law enforcement.

6. The system of claim 1, wherein said first database and/or said second database further comprise a map of a roadway system for at least said one or more first locations and/or said one or more second locations;

wherein said one or more indicators further comprise a display configured to present said map of said roadway system; and wherein said display is further configured to present one or more of said properties of traffic law enforcement and/or said predicted properties of traffic law enforcement on said map.

7. The system of claim 1, wherein said one or more user input systems are further configured to accept route guidance inputs from a user, said route guidance inputs comprising at least a starting location and a destination location;

wherein said one or more predictive processors further comprise one or more routing algorithms configured to determine one or more routes between said starting location and said destination location and identify an optimal route therefrom utilizing said properties of traffic law enforcement at said one or more first locations and/or said predicted properties of traffic law enforcement at said one or more second locations and/or traffic flow information associated with said one or more routes; and wherein said one or more predictive processors are further configured to provide at least one of said determined routes to said one or more indicators for presentation to said user.

8. The system of claim 1, further configured to provide a crowd sourced real-time and/or historic traffic law enforcement encounter record sharing service;

wherein said one or more predictive processors are further configured to utilize said network interface of one or more of said plurality of apparatuses to store in said first database and/or said second database one or more new records of crowd sourced traffic law enforcement encounters provided by one or more users via said one or more user input systems of said plurality of apparatuses, and/or to retrieve from said first database and/or said second database one or more records of said crowd sourced traffic law enforcement encounters provided by one or more users via said plurality of apparatuses.

9. The system of claim 1, wherein said one or more predictive processors are further configured to utilize historic and/or real-time traffic volume and/or traffic velocity associated with at least said one or more first locations and/or said one or more second locations in determining said properties of traffic law enforcement at said one or more first locations and/or said predicted properties of traffic law enforcement at said one or more second locations.

10. The system of claim 1, wherein said one or more predictive processors are further configured to determine when said location of a respective one of said plurality of apparatuses is within a distance threshold and/or a time threshold of one or more of said predicted patrol locations associated with said one or more first locations and/or said one or more second locations; and wherein said one or more indicators are further configured to present a notification in response to said determination.

11. The system of claim 1, wherein said one or more predictive processors are further configured to:

(a) receive one or more new crowd sourced traffic law enforcement encounters and/or one or more new issued citation records of traffic law enforcement via said network interface of one or more of said plurality of apparatuses and/or obtained from one or more of said first database, said second database, and/or one or more external databases;

(b) based at least in part on said one or more new crowd sourced traffic law enforcement encounters and/or said one or more new issued citation records of traffic law enforcement, apply said one or more algorithms to recompute and/or refine said properties of traffic law enforcement at said one or more first locations; and (c) based at least in part on said recomputed and/or refined properties of traffic law enforcement at said one or more first locations, apply and/or update said statistical, correlation-based, and/or inferential predictive relationships to recompute and/or refine said predicted properties of traffic law enforcement at said one or more second locations.

12. The system of claim 1, wherein said one or more predictive processors are further configured to determine a probability of occurrence of traffic law enforcement patrols at said one or more second locations as a function of one or more of: (i) said location of one or more of said plurality of apparatuses, (ii) a time, (iii) a date, and (iv) a direction of travel determined from changes in said location of said one or more of said plurality of apparatuses over time, based on said statistical, correlation-based, and/or inferential predictive relationships; and wherein said one or more indicators are further configured to present said probability as an indication of a likelihood of traffic law enforcement patrols.

13. The system of claim 1, wherein said GPS of one or more of said plurality of apparatuses is further configured to determine a speed of travel of each respective one of said one or more of said plurality of apparatuses utilizing changes in location of said respective apparatus over time;

wherein said properties of traffic law enforcement at said one or more first locations and/or said predicted properties of traffic law enforcement at said one or more second locations further comprise an estimated enforced speed limit; and wherein said one or more predictive processors are further configured to compare said speed of travel of each respective one of said one or more of said plurality of apparatuses with said estimated enforced speed limit and determine when said speed of travel approaches, reaches and/or exceeds said estimated enforced speed limit, and wherein said one or more indicators are further configured to present a warning in response to said determination.

14. The system of claim 1, wherein a speed and a direction of travel of each respective one of one or more of said plurality of apparatuses are determined utilizing changes in said location of said respective apparatus over time;

wherein said one or more predictive processors are further configured to determine when said one or more of said speed and direction of travel of said respective apparatus is in violation of or approaching a violation of at least one of said properties of traffic law enforcement at said one or more first locations and/or said predicted properties of traffic law enforcement at said one or more second locations associated with said location of said respective apparatus; and wherein said one or more indicators are further configured to present a notification in response to said determination.

15. The system of claim 1, wherein said properties of traffic law enforcement at said one or more first further comprise one or more of: estimated enforced speed limit, posted speed limit, real time location of traffic law enforcement, predicted real time location of traffic law enforcement patrols, estimated speed trap enforced location, estimated speed limit enforcement by aircraft location, estimated speed camera enforced location, estimated red light camera enforced intersection, histogram of violation speed, histogram of enforced traffic laws, location citation density, location patrol intensity, enforcement austerity, enforcement leniency, records of issued citations of traffic law enforcement, and records of crowd sourced encounters with traffic law enforcement;

wherein traffic flow information associated with a geographic region including said one or more first locations and/or said one or more second locations is determined from movement data associated with one or more of said plurality of apparatuses and/or one or more external traffic flow data sources;

wherein said traffic flow information comprises one or more of: vehicle speed, vehicle direction of travel, traffic density, traffic flow velocity, traffic volume, traffic congestion level, traffic flow patterns, and traffic movement patterns;

wherein said one or more predictive processors are further configured to: (a) analyze said traffic flow information at said one or more first locations in combination with said properties of traffic law enforcement at said one or more first locations to determine statistical, correlation-based, and/or inferential predictive relationships between traffic behavior and traffic law enforcement patrols, and (b) apply said statistical, correlation-based, and/or inferential predictive relationships to said one or more second locations utilizing said traffic flow information at said one or more second locations to refine said predicted properties of traffic law enforcement at said one or more second locations and/or at said location of one or more of said plurality of apparatuses;

wherein said one or more predictive processors are further configured to determine a likelihood of traffic law enforcement patrols at said one or more second locations and/or said location of one or more of said plurality of apparatuses based at least in part on deviations in said traffic flow information from expected traffic behavior derived from said statistical, correlation-based, and/or inferential predictive relationships; and wherein said one or more indicators are further configured to present a notification in response to said determined likelihood of traffic law enforcement patrols occurring at said one or more second locations and/or at said location of one or more of said plurality of apparatuses.

16. The system of claim 1, wherein said properties of traffic law enforcement at said one or more first further comprise one or more of: estimated enforced speed limit, posted speed limit, real time location of traffic law enforcement, predicted real time location of traffic law enforcement patrols, estimated speed trap enforced location, estimated speed limit enforcement by aircraft location, estimated speed camera enforced location, estimated red light camera enforced intersection, histogram of violation speed, histogram of enforced traffic laws, location citation density, location patrol intensity, enforcement austerity, enforcement leniency, records of issued citations of traffic law enforcement, and records of crowd sourced encounters with traffic law enforcement;

wherein traffic flow information associated with a geographic region including said one or more first locations and/or said one or more second locations is determined from movement data associated with one or more of said plurality of apparatuses and/or one or more external traffic flow data sources;

wherein said traffic flow information comprises one or more of: vehicle speed, vehicle direction of travel, traffic flow velocity, traffic volume, traffic density, traffic congestion level, traffic flow patterns, and traffic movement patterns;

wherein said one or more predictive processors are further configured to: (a) analyze said traffic flow information at said one or more first locations in combination with said properties of traffic law enforcement at said one or more first locations to determine statistical, correlation-based, and/or inferential predictive relationships between traffic behavior and traffic law enforcement patrols, and (b) apply said statistical, correlation-based, and/or inferential predictive relationships to said one or more second locations utilizing said traffic flow information at said one or more second locations to refine said predicted properties of traffic law enforcement at said one or more second locations and/or at said location of one or more of said plurality of apparatuses;

wherein said one or more predictive processors are further configured to determine when a speed and/or direction of travel of one or more of said plurality of apparatuses is in violation of or approaching a violation of at least one of said predicted properties of traffic law enforcement at said one or more second locations and/or said location of said one or more of said plurality of apparatuses based at least in part on deviations in said traffic flow information from expected traffic behavior derived from said statistical, correlation-based, and/or inferential predictive relationships; and wherein said one or more indicators are further configured to present a notification in response to said determination of said violation or said approaching violation of said predicted properties of traffic law enforcement at said one or more second locations and/or at said location of said one or more of said plurality of apparatuses.

17. The system of claim 1, wherein said one or more predictive processors are further configured to determine statistical, correlation-based, and/or inferential predictive relationships between traffic behavior and said properties of traffic law enforcement at said one or more first locations utilizing traffic flow information;

wherein traffic flow information associated with a geographic region including said one or more first locations and/or said one or more second locations is determined from movement data associated with one or more of said plurality of apparatuses and/or one or more external traffic flow data sources comprising movement data associated with vehicles within said geographic region; and wherein said one or more predictive processors are further configured to apply said statistical, correlation-based, and/or inferential predictive relationships to said traffic flow information at said one or more second locations to refine said predicted properties of traffic law enforcement at said one or more second locations and/or at said location of said one or more of said plurality of apparatuses.

18. A system for predicting properties of traffic law enforcement, said properties comprising one or more predicted patrol locations and/or one or more predicted patrol schedules, comprising:

one or more servers;

one or more clients;

one or more networks;

wherein said one or more clients are connected to said one or more servers through said one or more networks;

wherein said one or more servers comprise: (a) a database comprising records of traffic law enforcement citations and/or crowd sourced encounters with traffic law enforcement at a plurality of locations within a region, wherein each of said records comprises one or more of: location, time, date, direction of travel, citation type, and violation speed; and (b) one or more predictive processors configured to model traffic law enforcement behavior as a stochastic process by:

(i) treating said records of traffic law enforcement citations and/or said crowd sourced encounters as events of said stochastic process at said plurality of locations within said region, and (ii) time extrapolating periodic patrol patterns identified from said events to generate said properties of traffic law enforcement within said region;

wherein each of said one or more clients comprises: (a) a Global Positioning System (GPS) configured to determine a location, time and date of each respective one of said one or more clients; (b) a network interface configured to enable communication over said one or more networks between each respective one of said one or more clients and said one or more servers; (c) one or more indicators configured to present one or more of said properties of traffic law enforcement within said region; and (d) one or more user input systems configured to control one or more aspects of:

(i) collection and storage of data in said database comprising said records of traffic law enforcement citations and/or said crowd sourced encounters, (ii) retrieval of said records of traffic law enforcement citations and/or said crowd sourced encounters and/or said properties of traffic law enforcement from said database, (iii) outputs of said one or more predictive processors, and (iv) presentation of said properties of traffic law enforcement via said one or more indicators; and wherein said one or more servers are further configured to receive said location, time and date from each of said one or more clients through said one or more networks and generate said properties of traffic law enforcement specific to said location of each respective one of said one or more clients.

19. The system of claim 18, further forming a distributed compute and database system;

wherein said one or more servers and said one or more clients are in operable communication via said one or more networks with one or more additional servers each comprising at least one additional predictive processor and/or at least one additional database;

wherein said one or more predictive processors, either alone or in coordination with said at least one additional predictive processor of said one or more additional servers, are further configured to utilize said one or more networks to: (a) store in said at least one additional database of said one or more additional servers one or more records of crowd sourced encounters with traffic law enforcement provided by one or more users via said one or more user input systems of said one or more clients; and (b) derive one or more real time predicted patrol locations from said one or more records of crowd sourced encounters with traffic law enforcement stored in said at least one additional database of said one or more additional servers.

20. The system of claim 18, further providing a record of properties of traffic law enforcement sharing service;

wherein said one or more networks enable said one or more clients to communicate with said one or more servers;

wherein said database of said one or more servers comprises additional records of traffic law enforcement citations and/or additional records of crowd sourced encounters with traffic law enforcement provided by one or more of said one or more clients, for at least said region; and wherein said one or more predictive processors are further configured to at least partly derive one or more real time predicted patrol locations from said additional records of traffic law enforcement citations and/or said additional records of crowd sourced encounters with traffic law enforcement for at least said region.

21. The system of claim 18, further providing a real time traffic law enforcement patrol location sharing service;

wherein said one or more networks enable one or more users of said one or more clients to upload crowd sourced real time records of traffic law enforcement encounters to said database of said one or more servers;

wherein said uploaded crowd sourced real time records of traffic law enforcement encounters comprise a real time encounter location and one or more of: vehicle direction, vehicle speed, vehicle type, vehicle color, encounter or issue time, violation speed, and citation or encounter type;

wherein said one or more predictive processors are further configured to retrieve, filter and/or analyze at least a portion of said uploaded crowd sourced real time records of traffic law enforcement encounters to determine one or more real time predicted patrol locations of traffic law enforcement within said region; and wherein said one or more indicators are further configured to present a representation of said one or more real time predicted patrol locations of traffic law enforcement within said region.

22. A system for predicting properties of traffic law enforcement, said properties comprising one or more predicted patrol locations and/or one or more predicted patrol schedules, comprising:

a database comprising records of traffic law enforcement citations and/or crowd sourced encounters with traffic law enforcement at a plurality of locations within a region;

one or more predictive processors configured to model patrol scheduling tendencies from said records by:

(a) identifying recurring patrol patterns from said records at said plurality of locations within said region; and (b) extrapolating said recurring patrol patterns to generate said properties of traffic law enforcement within said region;

one or more indicators configured to present one or more of said properties of traffic law enforcement within said region;

one or more user input systems configured to control one or more aspects of data gathered within said database, outputs of said one or more predictive processors, and presentation of said properties of traffic law enforcement via said one or more indicators;

one or more apparatuses each comprising:

(a) a Global Positioning System (GPS) configured to determine a location, time and date of each respective one of said one or more apparatuses; and (b) a network interface configured to enable communication over a network between each respective one of said one or more apparatuses, said database, said one or more predictive processors, said one or more indicators, and said one or more user input systems;

wherein one or more of said database, said one or more predictive processors, said one or more indicators, and said one or more user input systems are hosted by one or more of said one or more apparatuses; and wherein said one or more indicators are further configured to present one or more of said properties of traffic law enforcement based on said location, time and date of any one of said one or more apparatuses.

23. The system of claim 22, further providing traffic flow speeds and volumes within said region;

wherein said database further comprises a map of a roadway system for at least said region;

wherein said database further comprises traffic flow database records comprising historic and/or real time traffic volume and/or traffic velocity for at least said region;

wherein said one or more predictive processors are further configured to retrieve, filter and/or analyze said traffic flow database records to produce historic and/or real time traffic flow volume and/or traffic velocity for locations on said roadway system for at least said region; and wherein said one or more indicators are further configured to present a representation of said historic and/or real time traffic flow volume and/or traffic velocity for locations on said roadway system.

24. The system of claim 22, wherein said properties of traffic law enforcement further comprise one or more of:

estimated enforced speed limit, posted speed limit, real time location of traffic law enforcement, predicted real time location of traffic law enforcement patrols, estimated speed trap enforced location, estimated speed limit enforcement by aircraft location, estimated speed camera enforced location, estimated red light camera enforced intersection, histogram of violation speed, histogram of enforced traffic laws, location citation density, location patrol intensity, enforcement austerity, enforcement leniency, records of issued citations of traffic law enforcement, and records of crowd sourced encounters with traffic law enforcement.

25. The system of claim 22, wherein said one or more predictive processors are further configured to store said generated properties of traffic law enforcement in said database as precomputed properties and to subsequently retrieve said precomputed properties for presentation via said one or more indicators.

* * * * *